TRANSCRIPT

(12) United States Patent
Takeda et al.

(10) Patent No.: US 11,400,931 B2
(45) Date of Patent: Aug. 2, 2022

(54) LANE DEPARTURE PREVENTION ASSIST SYSTEM FOR VEHICLE

(71) Applicant: HONDA MOTOR CO., LTD., Tokyo (JP)

(72) Inventors: Masanori Takeda, Wako (JP); Takashi Yanagi, Wako (JP); Takeyuki Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 16/802,475

(22) Filed: Feb. 26, 2020

(65) Prior Publication Data

US 2020/0276971 A1 Sep. 3, 2020

(30) Foreign Application Priority Data

Feb. 28, 2019 (JP) .............................. JP2019035965

(51) Int. Cl.
*B60W 30/12* (2020.01)
*B60W 30/02* (2012.01)
*B60W 40/112* (2012.01)
*B60N 2/10* (2006.01)
*B60N 2/16* (2006.01)
*G06V 20/56* (2022.01)

(52) U.S. Cl.
CPC .............. *B60W 30/12* (2013.01); *B60N 2/10* (2013.01); *B60N 2/16* (2013.01); *B60W 30/025* (2013.01); *B60W 40/112* (2013.01); *G06V 20/588* (2022.01); *B60W 2520/18* (2013.01); *B60W 2552/53* (2020.02)

(58) Field of Classification Search
USPC .......................................... 701/45
See application file for complete search history.

(56) References Cited

U.S. PATENT DOCUMENTS

| 2008/0211645 | A1* | 9/2008 | Mathes | G08G 1/167 340/435 |
| 2016/0129920 | A1* | 5/2016 | Hall | B60N 2/665 701/1 |
| 2017/0129372 | A1* | 5/2017 | Hein | B60N 2/10 |
| 2019/0047591 | A1* | 2/2019 | Augst | G05D 1/0088 |
| 2019/0061753 | A1* | 2/2019 | Tanaka | B60W 30/12 |

FOREIGN PATENT DOCUMENTS

JP 2011168194 A 9/2011

\* cited by examiner

*Primary Examiner* — Maceeh Anwari
(74) *Attorney, Agent, or Firm* — Armstrong Teasdale LLP

(57) ABSTRACT

A lane departure prevention assist system for a vehicle includes: a tilt angle control unit configured to control a tilt angle of a seat surface with respect to a lateral direction by driving a tilt angle changing device; a lane detection unit configured to detect a lane on a road; and a vehicle position estimation unit configured to estimate a lateral position of the vehicle in the lane. The tilt angle control unit is configured to increase the tilt angle of the seat surface with respect to the lateral direction such that, as the vehicle approaches one lateral end of an own lane, a height of the seat surface on a side near the one lateral end of the own lane becomes greater than the height of the seat surface on a side remote from the one lateral end of the own lane.

8 Claims, 23 Drawing Sheets first lane condition second lane condition third lane condition fourth lane condition

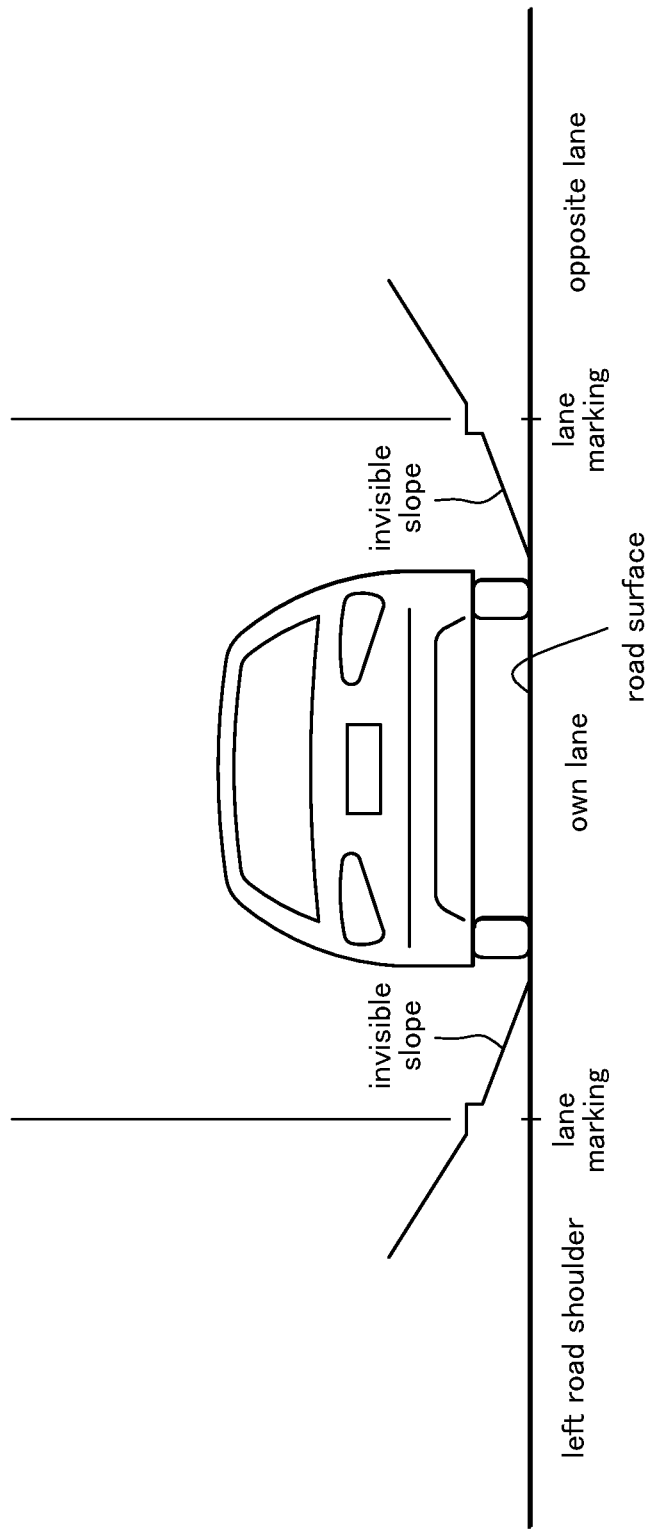

LANE DEPARTURE PREVENTION ASSIST SYSTEM FOR VEHICLE

TECHNICAL FIELD

The present invention relates to a lane departure prevention assist system for a vehicle, and particularly to a lane departure prevention assist system for a vehicle that assists prevention of a lane departure by increasing a tilt angle of a seat surface of an occupant seat with respect to a lateral direction as the vehicle approaches one lateral end of an own lane in which the vehicle is traveling.

BACKGROUND ART

As driving assist systems for a vehicle that travels along a lane, Lane Keeping Assist System (LKAS) and Lane Departure Warning (LDW) are known. LKAS is a system for reducing a load of driver's steering operation by applying steering torque to a steering device by Electric Power Steering (EPS) or generating different braking/driving forces on left and right wheels so that the vehicle can travel near the center of the lane. LDW is a system for warning a driver by a warning display, a warning sound, vibrations, and the like when the vehicle departs from or is likely to depart from the lane due to drowsy driving, inattentive driving, and the like.

JP2011-168194A discloses a lane departure prevention assist system including an ECU that executes LKAS processing and LDW processing. In this lane departure prevention assist system, a vehicle speed detection unit recognizes a white line on a road by analyzing an image of the road captured by a camera and the like, and the ECU computes a lane width and a lane offset, which is an amount of lateral displacement between a center line of a vehicle and a center line of a lane, based on the information of the white line. When LKAS processing is executed by the ECU, steering torque (assist torque) is applied to a steering device by a steering torque applying unit. When LDW processing is executed by the ECU, a departure warning sound is generated by a warning buzzer, or steering vibrations, seat vibrations, or seat belt vibrations are generated by a vibration generator. In a case where a driver performs lane change operation, the ECU stops the lane departure prevention assist processing such as LKAS processing and LDW processing when the lane offset becomes equal to or greater than a threshold.

However, such a conventional lane departure prevention assist system warns the driver of a lane departure by vibrating the steering system in response to a change in steering torque or the like. Therefore, it is difficult for the driver to intuitively recognize what the warning is about.

SUMMARY OF THE INVENTION

In view of such a problem of the prior art, a primary object of the present invention is to provide a lane departure prevention assist system for a vehicle that enables a driver to intuitively recognize a lane departure.

To achieve such an object, one embodiment of the present invention provides a lane departure prevention assist system for a vehicle (1) that includes: a tilt angle changing device (9, 60) provided between a vehicle body (2) and wheels (4) or between the vehicle body and a seat surface (27A) of an occupant seat (27) and configured to change a tilt angle of the seat surface with respect to a lateral direction; a tilt angle control unit (35, 85) configured to control the tilt angle of the seat surface with respect to the lateral direction by driving the tilt angle changing device; a lane detection unit (32) configured to detect a lane on a road; and a vehicle position estimation unit (33) configured to estimate a lateral position of the vehicle in the lane, wherein the tilt angle control unit is configured to increase the tilt angle of the seat surface with respect to the lateral direction such that, as the vehicle approaches one lateral end of an own lane in which the vehicle is traveling, a height of the seat surface on a side near the one lateral end of the own lane becomes greater than the height of the seat surface on a side remote from the one lateral end of the own lane.

According to this arrangement, the seat surface of the occupant seat tilts such that, as the vehicle approaches the one lateral end of the own lane, the height of the seat surface on the side near the one lateral end of the own lane becomes greater than the height of the seat surface on the far side thereof. Therefore, a driver feels as if the own lane might have a crossing slope (namely, lateral slope) that becomes higher toward the one lateral end of the own lane. Thereby, the driver can intuitively recognize that the vehicle is likely to depart from the own lane when the vehicle approaches the one lateral end of the own lane.

Preferably, the lane departure prevention assist system further includes a turn detection unit (31) configured to detect a turn of the vehicle (1), wherein the tilt angle control unit (35, 85) is configured to increase the tilt angle of the seat surface with respect to the lateral direction such that the height of the seat surface on an outside of the turn of the vehicle becomes greater than the height of the seat surface on an inside of the turn of the vehicle.

According to this arrangement, the driver feels as if the own lane might have a greater crossing slope on the outside of the turn than the inside thereof. Thereby, the driver can intuitively recognize that the vehicle is likely to depart from the own lane to the outside of the turn when the vehicle approaches the one lateral end of the own lane on the outside of the turn.

Preferably, the lane detection unit (32) is configured to detect lane markings on the road, and the tilt angle control unit (35, 85) is configured to increase the tilt angle of the seat surface (27A) with respect to the lateral direction such that the height of the seat surface on one lateral side increases in a case where the vehicle position estimation unit (33) estimates that one of the wheels (4) on the one lateral side climbs onto one of the lane markings on a corresponding side.

According to this arrangement, when the one of the wheels on the one lateral side climbs onto the one of the lane markings, the driver feels as if this wheel might climb onto the lane marking that has a certain height. Thereby, the driver can intuitively recognize that this wheel departs from the own lane and climbs onto the lane marking.

Preferably, the tilt angle control unit (35, 85) is configured to decrease the tilt angle of the seat surface (27A) with respect to the lateral direction such that the height of the seat surface on the one lateral side decreases in a case where the vehicle position estimation unit (33) estimates that the one of the wheels (4) on the one lateral side climbs onto and then climbs over the one of the lane markings provided between the own lane and an adjacent lane.

According to this arrangement, when the one of the wheels on the one lateral side climbs over the one of the lane markings and moves to the adjacent lane, the driver feels as if this wheel might climb over a lane marking that has a certain height. Thereby, the driver can intuitively recognize that this wheel climbs over the lane marking.

Preferably, tilt angle control unit (35, 85) does not change the height of the seat surface (27A) on both lateral sides in a case where the vehicle position estimation unit (33) estimates that the one of the wheels (4) on the one lateral side climbs over and then climbs again onto the one of the lane markings to return to the own lane.

According to this arrangement, in a case where the vehicle enters the adjacent lane and then returns to the own lane (original lane) without changing lanes, the seat surface of the occupant seat does not tilt when the one of the wheels on the one lateral side climbs over the one of the lane markings such as a lane boundary line. Thereby, the driver does not feel bothered.

Preferably, the tilt angle control unit (35, 85) does not change the height of the seat surface (27A) on both lateral sides in a case where the vehicle position estimation unit (33) estimates that the one of the wheels (4) on the one lateral side climbs onto and then climbs over the one of the lane markings, and then another of the wheels (4) on another lateral side climbs onto the one of the lane markings.

According to this arrangement, in a case where the driver intentionally changes lanes, the seat surface of the occupant seat does not tilt when another of the wheels, which climbs over the one of the lane markings after the one of the wheels, climbs onto the one of the lane markings. Thereby, the driver does not feel bothered.

Preferably, the lane detection unit (32) is configured to identify a road outside line provided between the own lane and a road shoulder, and the tilt angle control unit (35, 85) is configured to increase the tilt angle of the seat surface (27A) with respect to the lateral direction such that the height of the seat surface on a side of the road shoulder becomes greater as an entry amount of the vehicle (1) into the road shoulder becomes greater in a case where the vehicle position estimation unit (33) estimates that the vehicle enters the road shoulder.

According to this arrangement, when the vehicle enters the road shoulder, the tilt angle of the seat surface of the occupant seat increases according to the entry amount of the vehicle into the road shoulder. Thereby, the driver can intuitively recognize that the vehicle should return to the own lane (namely, original lane).

Preferably, wherein the lane detection unit (32) is configured to identify a road center line provided between the own lane and an opposite lane, and the tilt angle control unit (35, 85) is configured to increase the tilt angle of the seat surface (27A) with respect to the lateral direction such that the height of the seat surface on a side of the opposite lane becomes greater as an entry amount of the vehicle (1) into the opposite lane becomes greater in a case where the vehicle position estimation unit (33) estimates that the vehicle enters the opposite lane.

According to this arrangement, when the vehicle enters the opposite lane, the tilt angle of the seat surface of the occupant seat increases according to the entry amount of the vehicle into the opposite lane. Therefore, the driver can intuitively recognize that the vehicle should return to the own lane (namely, original lane).

Preferably, the lane departure prevention assist system further includes a intent determination unit (36) configured to determine whether a driver has lane change intent and the tilt angle control unit (35, 85) is configured to stop performing the above-mentioned lane departure prevention assist processing in a case where the intent determination unit determines that the driver has the lane change intent.

According to this arrangement, in a case where the driver intentionally changes lanes, the seat surface of the occupant seat does not tilt according to a position of the vehicle. Thereby, the driver does not feel bothered.

Preferably, the tilt angle changing device includes a roll angle changing device (9) configured to change a roll angle of the vehicle body (2), and the tilt angle control unit includes a roll control unit (35) configured to control the roll angle of the vehicle body by driving the roll angle changing device.

According to this arrangement, not only the seat surface of the occupant seat but also the entire vehicle body tilts laterally with respect to a road. Thereby, the driver surely feels as if the own lane might have a crossing slope that becomes higher toward the one lateral end of the own lane.

Preferably, the tilt angle changing device includes a seat surface tilt angle changing device (60) configured to change the tilt angle of the seat surface (27A) of the occupant seat (27) with respect to the vehicle body (2), and the tilt angle control unit includes a seat surface tilt angle control unit (85) configured to control the tilt angle of the seat surface by driving the seat surface tilt angle changing device.

According to this arrangement, the tilt angle changing device can be downsized or simplified. Also, the seat surface of the occupant seat can tilt greatly by operating the tilt angle changing device in a small size. Thereby, the driver can surely recognize that the vehicle is likely to depart from the own lane when the vehicle approaches the one lateral end of the own lane.

Preferably, the seat surface tilt angle changing device includes a seat tilt angle changing device (60) configured to change a tilt angle of the occupant seat (27) with respect to the vehicle body (2), and the seat surface tilt angle control unit includes a seat tilt angle control unit (85) configured to tilt the occupant seat by driving the seat tilt angle changing device.

According to this arrangement, not only the seat surface but also the entire occupant seat including a seat back tilts. Thereby, the driver can surely recognize that the vehicle is likely to depart from the own lane when the vehicle approaches the one lateral end of the own lane.

Thus, according to one embodiment of the present invention, it is possible to provide a lane departure prevention assist system for a vehicle that enables a driver to intuitively recognize a lane departure.

BRIEF DESCRIPTION OF THE DRAWINGS

FIG. 3 is a flow chart of LDW roll control by a roll control unit shown in

FIG. 2;

FIG. 8B is a rear view showing the road surface condition felt by the driver in the fourth lane condition;

DESCRIPTION OF THE PREFERRED EMBODIMENT(S)

In the following, two embodiments of the present invention will be described in detail with reference to the drawings.

First Embodiment

Figure 1:
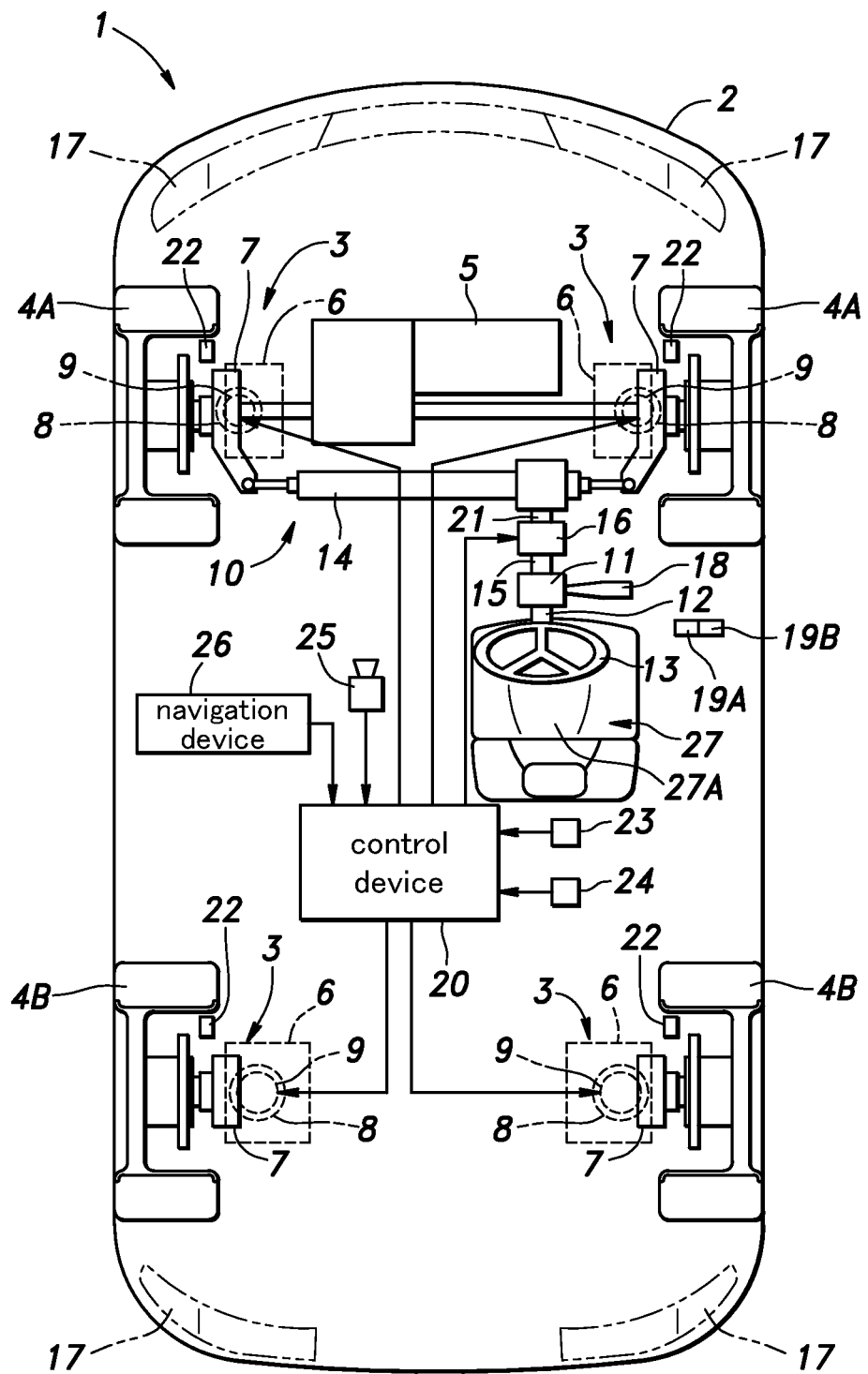
FIG. 1 is a schematic diagram of a vehicle provided with a lane departure prevention assist system according to a first embodiment.

First, a first embodiment of the present invention will be described with reference to FIGS. 1 to 11B. FIG. 1 is a schematic diagram of a vehicle 1 provided with a lane departure prevention assist system according to the first embodiment. As shown in FIG. 1, the vehicle 1 is a four-wheel automobile having left and right front wheels 4A and left and right rear wheels 4B supported by a vehicle body 2 via four suspension devices 3. The vehicle body 2 composes a framework of the vehicle 1.

A power plant 5 that drives the wheels 4 (4A, 4B) is mounted on the vehicle body 2. The power plant 5 may include at least one of an internal combustion engine such as a gasoline engine or a diesel engine and an electric motor. In the present embodiment, the power plant 5 includes the gasoline engine, and the vehicle 1 is a front-wheel drive vehicle in which a driving force and rotational resistance (braking force) of the power plant 5 are transmitted to the front wheels 4A. In other embodiments, the vehicle 1 may be a four-wheel drive vehicle or a rear-wheel drive vehicle, and may be a hybrid vehicle or an electric vehicle.

Each suspension device 3 includes a suspension arm 6 rotatably supported by the vehicle body 2. At a free end of the suspension arm 6, a knuckle 7 that rotatably supports each of the front wheels 4A and the rear wheels 4B is provided. A spring 8 and an active damper 9 are provided between the vehicle body 2 and the suspension arm 6.

The vehicle 1 includes four active dampers 9 in total. Each active damper 9 is interposed between each wheel 4 and a corresponding part of the vehicle body 2, and is configured to change a height of the corresponding part of the vehicle body 2 with respect to each wheel 4. These active dampers 9 compose a roll angle changing device configured to change a roll angle of the vehicle body 2 by changing heights of left and right corresponding parts of the vehicle body 2 with respect to the wheels 4 such that the heights of the left and right corresponding parts of the vehicle body 2 are different from each other. In other embodiments, an air suspension or an active stabilizer may be used as a roll angle changing device, instead of or in addition to the active dampers 9.

The vehicle 1 includes a steering device 10 that steers (turns) the front wheels 4A. The steering device 10 includes a steering shaft 12 rotatably supported by a steering column 11 and a steering wheel 13 provided at one end of the steering shaft 12. A pinion is provided at another end of the steering shaft 12, and a rack gear of a rack shaft 14 that extends laterally meshes with the pinion. Both lateral ends of the rack shaft 14 are connected to the left and right knuckles 7 via tie rods. When the steering wheel 13 rotates, the rack shaft 14 moves laterally to rotate the knuckles 7, thereby the left and right front wheels 4A are steered (turned).

The steering shaft 12 is provided with a steering torque sensor 15 and an assist motor 16. The steering torque sensor 15 detects steering torque acting on the steering shaft 12. The assist motor 16 applies assist torque, which corresponds to the steering torque, to the steering shaft 12. That is, the steering device 10 composes an electric power steering. In other embodiments, the steering device 10 may compose a steer-by-wire system that includes a reaction motor and a steering motor and mechanically separates the steering wheel 13 from the front wheels 4A.

The steering column 11 is provided with a turn signal lever 18 (direction indicator switch) for operating left and right turn signals 17 (direction indicators). Assist switches 19 (19A, 19B) for switching on/off the lane departure prevention assist system are provided on a periphery of the steering column 11. The lane departure prevention assist system has an LKAS function and an LDW function, and the assist switches 19 include an LKAS switch 19A for the LKAS function and an LDW switch 19B for the LDW function. That is, the assist switches 19 are provided for each function of the lane departure prevention assist system.

The vehicle 1 is provided with a control device 20 that controls driving of each active damper 9, the assist motor 16, and the like to assist prevention of a lane departure of the vehicle 1. The control device 20 is an electronic control unit (ECU) including a CPU, a ROM, a RAM, peripheral circuits, an input/output interface, various drivers, and the like. The above-mentioned steering torque sensor 15 outputs a signal corresponding to the steering torque acting on the steering shaft 12 to the control device 20.

The vehicle 1 is provided with various sensors such as a steering angle sensor 21, vehicle speed sensors 22, a lateral acceleration sensor 23, and a yaw rate sensor 24. The steering angle sensor 21 outputs a signal corresponding to a rotation angle of the steering shaft 12 to the control device 20. The control device 20 obtains a front-wheel steering angle, which is a steering angle of the front wheels 4A, based on the signal from the steering angle sensor 21. Each vehicle speed sensor 22 is provided in each of the front wheels 4A and the rear wheels 4B, and outputs a pulse signal, which is generated according to a rotation of each of the front wheels 4A and the rear wheels 4B, to the control device 20. The control device 20 obtains a wheel speed of each of the front wheels 4A and the rear wheels 4B based on the pulse signal from each vehicle speed sensor 22, and then obtains a vehicle speed by averaging the wheel speed of each of the front wheels 4A and the rear wheels 4B.

Also, the vehicle 1 is provided with a front camera 25 that captures an image of the front of the vehicle 1. The front camera 25 composes a lane detection device for detecting a lane on a road, and consists of, for example, a digital camera using a solid imaging element such as a CCD or a CMOS. The front camera 25 is provided in at least one suitable part of the vehicle body 2, and outputs data of the captured image to the control device 20.

Further, the vehicle 1 is provided with a navigation device 26 that has map information. The map information of the navigation device 26 includes not only road position information but also lane information such as the number of lanes, the position of a center line, and the width of each lane. The navigation device 26 identifies a position (latitude and longitude) of the vehicle 1 based on a signal received from an artificial satellite (positioning satellite).

In a cabin of the vehicle 1, an occupant seat 27 is provided at the rear of the steering wheel 13. Also, a passenger seat and a rear seat (not shown) may be provided in the cabin. The occupant seat 27 provides a driver's seat in the cabin.

Figure 2:
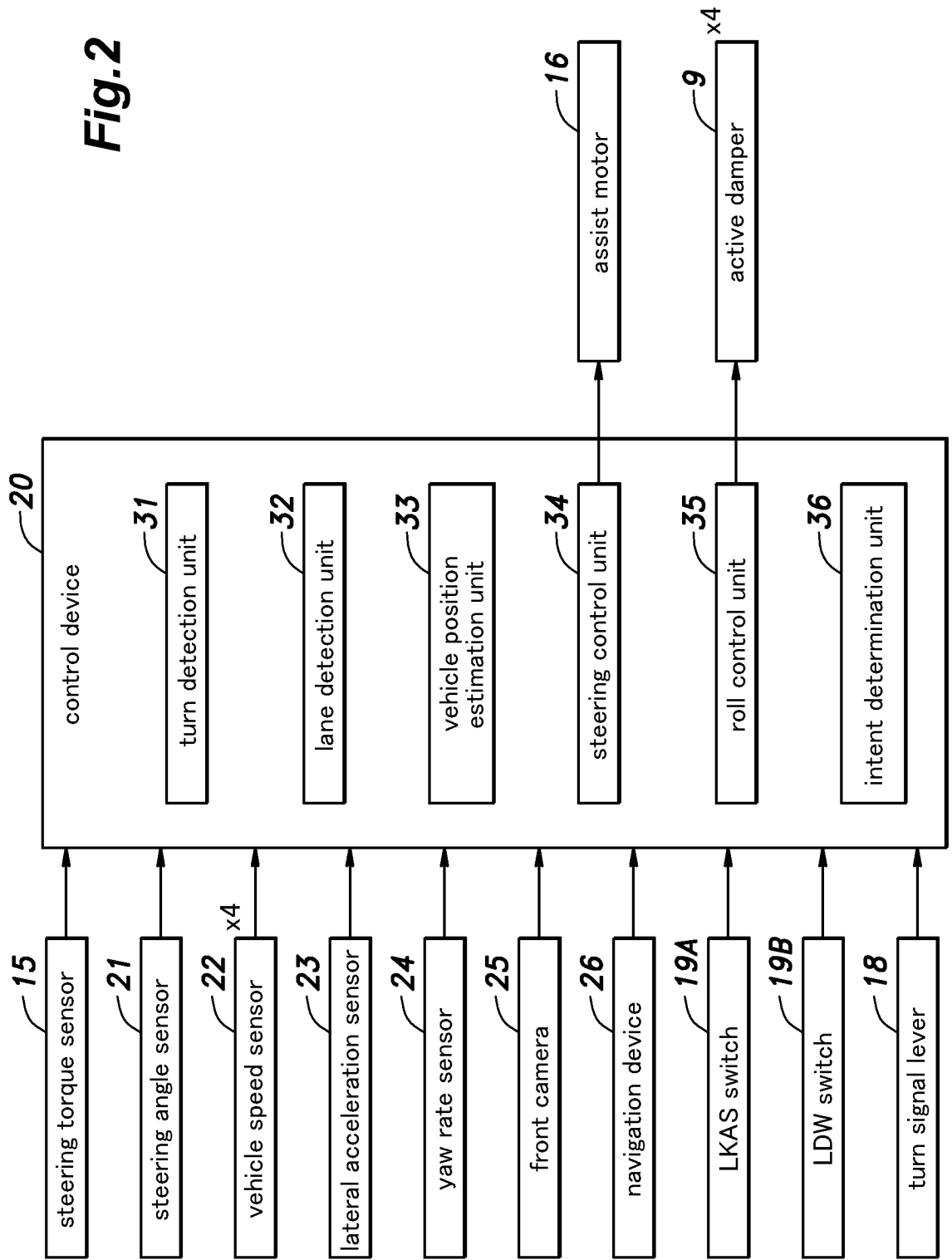
FIG. 2 is a functional block diagram of a control device shown in FIG. 1.

FIG. 2 is a functional block diagram of the control device 20 shown in FIG. 1. As shown in FIG. 2, the control device 20 includes a turn detection unit 31, a lane detection unit 32, a vehicle position estimation unit 33, a steering control unit 34, a roll control unit 35, and an intent determination unit 36.

The turn detection unit 31 determines that the vehicle 1 is turning based on the vehicle speed obtained from each vehicle speed sensor 22 and the front-wheel steering angle obtained from the steering angle sensor 21. That is, each vehicle speed sensor 22 and the steering angle sensor 21 compose a turn detection device for detecting a turn of the vehicle 1. In other embodiments, the lateral acceleration sensor 23 or the yaw rate sensor 24 may be used as the turn detection device. That is, in other embodiments, the turn detection unit 31 may determine that the vehicle 1 is turning based on the lateral acceleration obtained from the lateral acceleration sensor 23 or the yaw rate obtained from the yaw rate sensor 24, instead of or in addition to the vehicle speed obtained from each vehicle speed sensor 22 and the front-wheel steering angle obtained from the steering angle sensor 21.

The lane detection unit 32 detects left and right road ends and lane markings on the road by analyzing the image captured by the front camera 25, and also detects lanes and road shoulders based on the detected road ends and lane markings. That is, the front camera 25 is a lane detection device for detecting a lane on the road.

In the present embodiment, the lane markings mean lines provided on a road surface to define lateral ends of the lane, and include a road center line, a road outside line, a lane boundary line, and the like. The road center line is a lane marking provided between two adjacent lanes in opposite traveling directions in order to divide the adjacent lanes according to the traveling directions. The road outside line is a lane marking provided at an outside end of the lane. The lane boundary line is a lane marking provided between two adjacent lanes in the same traveling direction on a road having plural lanes on one side (in the same traveling direction). The lane is formed between two adjacent lane markings, and these lane markings compose lateral ends of the lane.

The road ends mean ends of a road surface (paved surface) on the road. That is, the road ends mean boundary lines between the road surface and the objects such as gutters, curbs, exposed roadbeds, and earth accumulated on the road surface. The road shoulder is formed between the road end and the road outside line. In the road on which the road surface is not provided with the road outside line, the road end corresponds to the lateral end of the lane. In the road on which the road surface is provided with the road outside line, the road end corresponds to the lateral end of the road shoulder (road shoulder end).

The lane detection unit 32 identifies the type of the lane, such as a traveling lane, a passing lane, and an opposite lane, by comparing the detected lanes with the lanes included in the map information of the navigation device 26. The lane detection unit 32 identifies the type of the detected lane marking, such as the road center line, the road outside line, or the lane boundary line. In other embodiments, the lane detection unit 32 may identify the type of the lane or the type of the lane marking based on information about the image captured by the front camera 25, without using the map information of the navigation device 26.

The vehicle position estimation unit 33 estimates a position of the vehicle 1 (specifically, a lateral position of the vehicle 1 in the detected lane) by analyzing the image captured by the front camera 25. In the following, the position of the vehicle 1 estimated by the vehicle position estimation unit 33 is referred to as "own vehicle position" to distinguish it from the position of the vehicle 1 identified by the navigation device 26. Also, the vehicle position estimation unit 33 estimates a width of the lane in which the vehicle 1 is traveling (Hereinafter referred to as "own lane") by analyzing the image captured by the front camera 25. Further, the vehicle position estimation unit 33 estimates a distance from the left and right edges of the vehicle 1 to the lane markings on corresponding sides based on the width of the own lane, the position of the vehicle 1, and a lateral size of the vehicle 1 held as information in advance.

The steering control unit 34 controls output of the assist motor 16 by executing Electric Power Steering control (EPS control) when the LKAS switch 19A is off. The EPS control is executed for making the assist motor 16 generate the assist torque which corresponds to the steering torque. The steering control unit 34 controls the output of the assist motor 16 by executing Lane Keeping Assist control (LKA control) when the LKAS switch 19A is on. The LKA control is a control for making the assist motor 16 generate steering torque for realizing the front-wheel steering angle that keeps the vehicle 1 within the own lane.

Also, the steering control unit 34 executes Lane Departure Warning steering control (LDW steering control) when the LDW switch 19B is on. The LDW steering control is executed for warning the driver by vibrating the steering wheel 13 in response to alternating output of the assist motor 16 when the vehicle 1 departs from or is likely to depart from the own lane. The steering control unit 34 does not execute the LDW steering control when the LDW switch 19B is off. The steering control unit 34 executes the LDW steering control regardless of whether the LKAS switch 19A is on or off. This is because the vehicle 1 may be likely to depart from the own lane due to disturbance or unintended operation by the driver even when the LKAS function is on.

The roll control unit 35 executes Lane Departure Warning roll control (LDW roll control) when the LDW switch 19B is on. The LDW roll control is a control for warning the driver by controlling the roll angle of the vehicle body 2 when the vehicle 1 departs from or is likely to depart from the own lane. In the present embodiment, the above-mentioned control of the roll angle includes not only direct control of the roll angle but also indirect control of the roll angle resulting from control of vehicle heights of the vehicle body 2 on both lateral sides with respect to the wheels 4 on both lateral sides. The roll control unit 35 does not execute the LDW roll control when the LDW switch 19B is off.

The LDW roll control, which is described later in detail, assists prevention of a lane departure of the vehicle 1 by driving the active dampers 9 as the roll angle changing device to control the roll angle of the vehicle body 2 (vehicle heights of the vehicle body 2 on both lateral sides) based on the own vehicle position estimated by the vehicle position estimation unit 33. Like the steering control unit 34, the roll control unit 35 executes the LDW roll control regardless of whether the LKAS switch 19A is on or off.

The LKA control and the LDW steering control by the steering control unit 34 and the LDW roll control by the roll control unit 35 are included in lane departure prevention assist processing by the lane departure prevention assist system that assists prevention of the lane departure of the vehicle 1. The lane departure prevention assist processing may also include the processing for warning the driver of the lane departure by displaying a warning on an instrument panel or the like or by making a warning buzzer generate a warning sound.

The intent determination unit 36 is determines whether the driver has lane change intent based on an operation state of the turn signal lever 18. Specifically, the intent determination unit 36 determines that the driver has the lane change intent in a case where the turn signal lever 18 is operated to a direction indicating position to blink either one of the left and right turn signals 17. Alternatively, the intent determination unit 36 may determine that the driver has the lane change intent in a case where the turn signal lever 18 or another operating member is operated to a hazard position to blink both of the left and right turn signals 17. Further, the intent determination unit 36 may determine that the driver has the lane change intent in a case where the steering torque obtained from the steering torque sensor 15 is equal to or more than a prescribed threshold.

In the following, the LDW roll control by the roll control unit 35 is described specifically. The roll control unit 35 starts the following LDW roll control when the LDW switch 19B is turned on, and ends the LDW roll control when the LDW switch 19B is turned off. Also, the roll control unit 35 ends the LDW roll control in a case where the intent determination unit 36 determines that the driver has the lane change intent in a state where the LDW switch 19B is on. Thereafter, the roll control unit 35 restarts the LDW roll control in a case where the intent determination unit 36 determines that the driver cease to have the lane change intent. In a case where the LDW roll control ends, the roll control unit 35 returns the four active dampers 9 to initial positions to equalize the vehicle heights of the vehicle body 2 on both lateral sides (to reduce the roll angle to zero).

Figure 3:
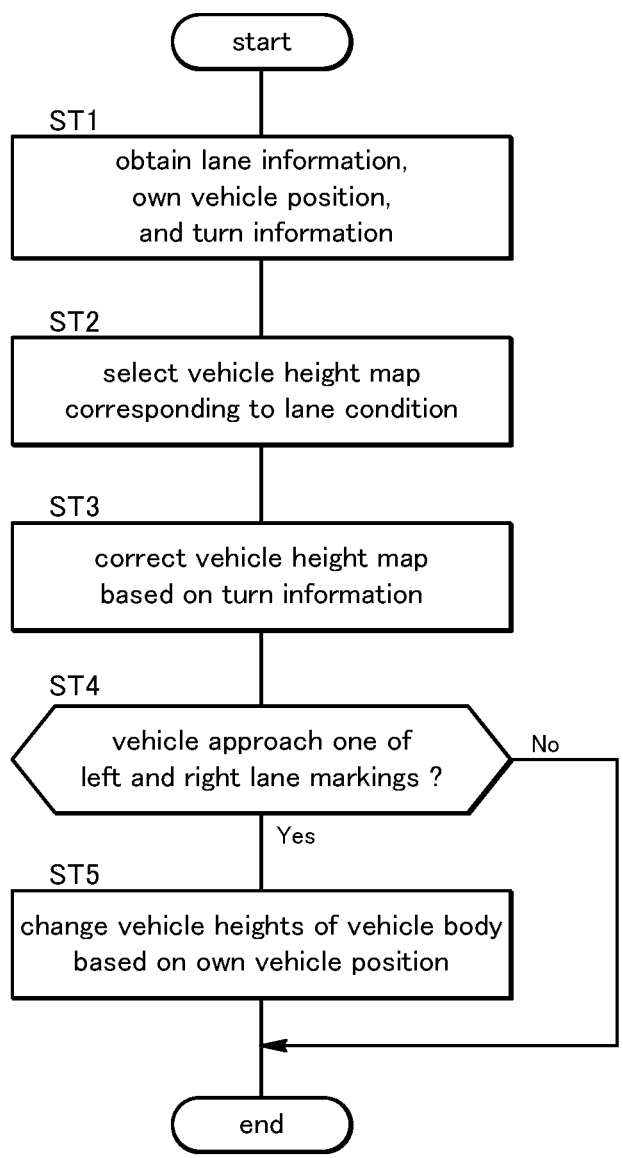

As shown in FIG. 3, when the LDW roll control is started, the roll control unit 35 obtains the lane information from the lane detection unit 32, obtains the own vehicle position from the vehicle position estimation unit 33, and obtains the turn information from the turn detection unit 31 (step ST1). Next, the roll control unit 35 determines a lane condition based on the obtained lane information, and selects a vehicle height map corresponding to the lane condition (step ST2). The lane condition is classified into plural patterns so that each pattern corresponds to the conditions on the left and right sides of the own lane in which the vehicle 1 travels. The turn information includes information as to whether the vehicle is traveling straight or turning.

Figure 4A:
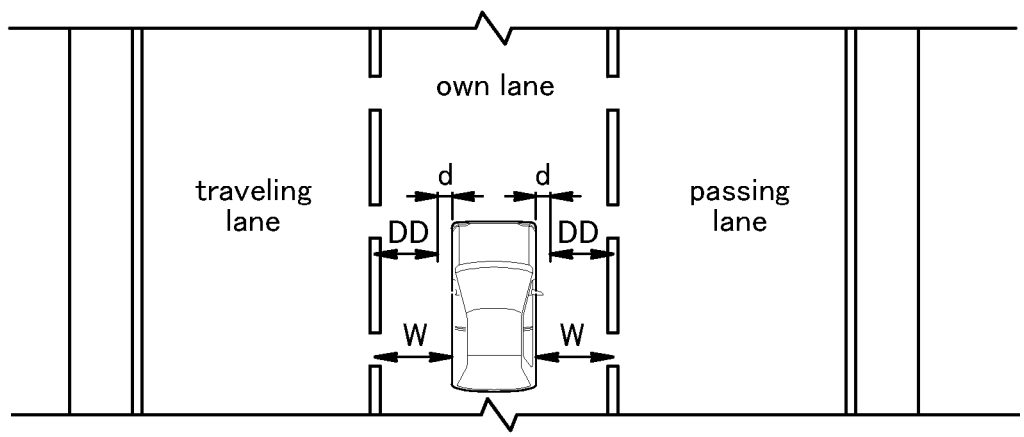
FIG. 4A is an explanatory diagram of a first lane condition.
Figure 4B:
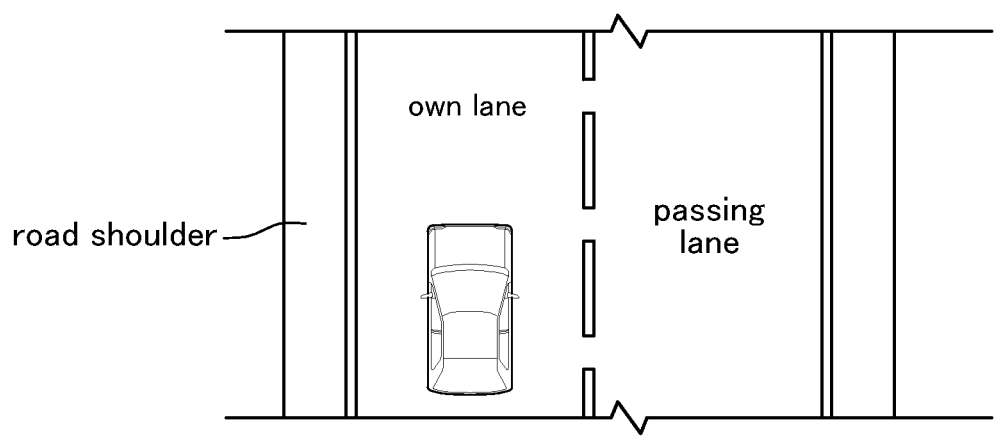
FIG. 4B is an explanatory diagram of a second lane condition.
Figure 4C:
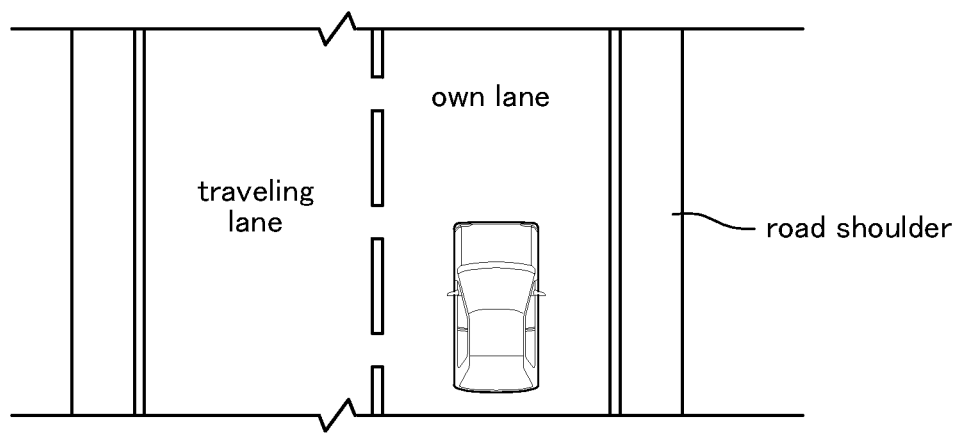
FIG. 4C is an explanatory diagram of a third lane condition.
Figure 4D:
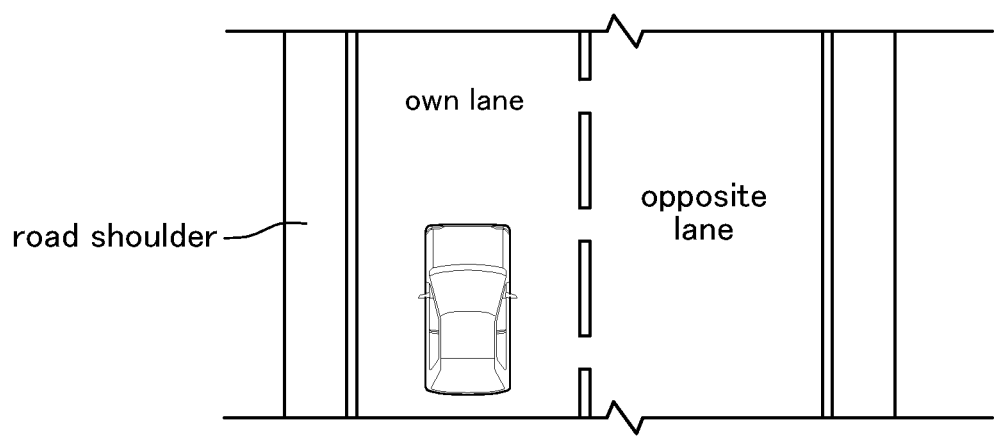
FIG. 4D is an explanatory diagram of a fourth lane condition.

FIGS. 4A to 4D are explanatory diagrams of the lane condition. The lane condition is classified into first to fourth lane conditions shown in FIGS. 4A to 4D, respectively. As shown in FIG. 4A, the first lane condition is a condition in which lanes in the same traveling direction (traveling lanes and/or passing lanes) are on the left and right sides of the own lane. As shown in FIG. 4B, the second lane condition is a condition in which a road shoulder is on the left side of the own lane, and a lane in the same traveling direction (passing lane) is on the right side of the own lane. As shown in FIG. 4C, the third lane condition is a condition in which a lane in the same traveling direction (traveling lane) is on the left side of the own lane, and a road shoulder is on the right side of the own lane. As shown in FIG. 4D, the fourth lane condition is a condition in which a road shoulder is on the left side of the own lane and an opposite lane is on the right side of the own lane. Incidentally, a condition in which road shoulders are on the left and right sides of the own lane is also determined (classified) as the fourth lane condition.

As shown in FIG. 3, after selecting the vehicle height map in step ST2, the roll control unit 35 corrects the vehicle height map based on the turn information obtained in step ST1 (step ST3). The vehicle height map and the correction thereof will be described later in detail. Next, the roll control unit 35 determines whether the vehicle 1 approaches one of the left and right lane markings based on the own vehicle position obtained in step ST1 (step ST4). Specifically, the roll control unit 35 determines whether the deviation amount of the own vehicle position (center of the vehicle 1) from the center of the own lane is equal to or more than a prescribed threshold d. The threshold d varies according to the width of the own lane estimated by the vehicle position estimation unit 33.

For example, in a case where the width of the own lane estimated by the vehicle position estimation unit 33 is 3.5 m and the width of the vehicle 1 is 1.8 m, the distance from the vehicle 1 to each of the left and right lane markings (hereinafter referred to as "margin width W") is 85 cm when the vehicle 1 is traveling at the center of the own lane. The prescribed threshold d is a value obtained by subtracting a value (hereinafter referred to as "warning start distance DD") from the margin width W (85 cm). The warning start distance DD is set as a distance from the vehicle 1 to each of the left and right lane markings to start a lane departure warning due to the roll of the vehicle 1. For example, the warning start distance DD may be set to 70 cm, 60 cm, or 50 cm in advance. For example, in a case where the warning start distance DD is set to 60 cm in advance and the width of the own lane estimated by the vehicle position estimation unit 33 is 3.5 m, the threshold d of the deviation amount in the own lane is set to 25 cm. Therefore, when the own vehicle position deviates from the center of the own lane to the left or right by 25 cm, the roll control unit 35 determines that the vehicle 1 approaches one of the left and right lane markings.

By the way, the margin width W obtained from the width of the own lane estimated by the vehicle position estimation unit 33 and the width of the vehicle 1 may be smaller than the warning start distance DD set in advance. For example, in a case where the width of the own lane estimated by the vehicle position estimation unit 33 is 2.5 m and the width of the vehicle 1 is 1.8 m, the margin width W (35 cm) is smaller than the warning start distance DD (60 cm) set in advance. In such a case, the threshold d of the deviation amount is set to 0 cm or a width corresponding to a dead zone (for example, 5 cm), and the warning start distance DD is obtained and set based on these values. For example, in the above-mentioned case where the width of the own lane is 2.5 m, the width of the vehicle 1 is 1.8 m, and the threshold d of the deviation amount is 5 cm, the warning start distance DD is set to 0.3 m (=(2.5−1.8−0.05×2)/2).

As shown in FIG. 3, in a case where the determination in step ST4 is No, the roll control unit 35 returns to step ST1 to repeat the above processing. On the other hand, in a case where the determination in step ST4 is Yes, the roll control unit 35 refers to the selected vehicle height map and drives each active damper 9 to change the vehicle heights of the vehicle body 2 on both lateral sides based on the own vehicle position (step ST5). That is, the roll control unit 35 controls the roll angle of the vehicle body 2. Thereafter, the roll control unit 35 returns to step ST1 to repeat the above processing.

Figure 5A:
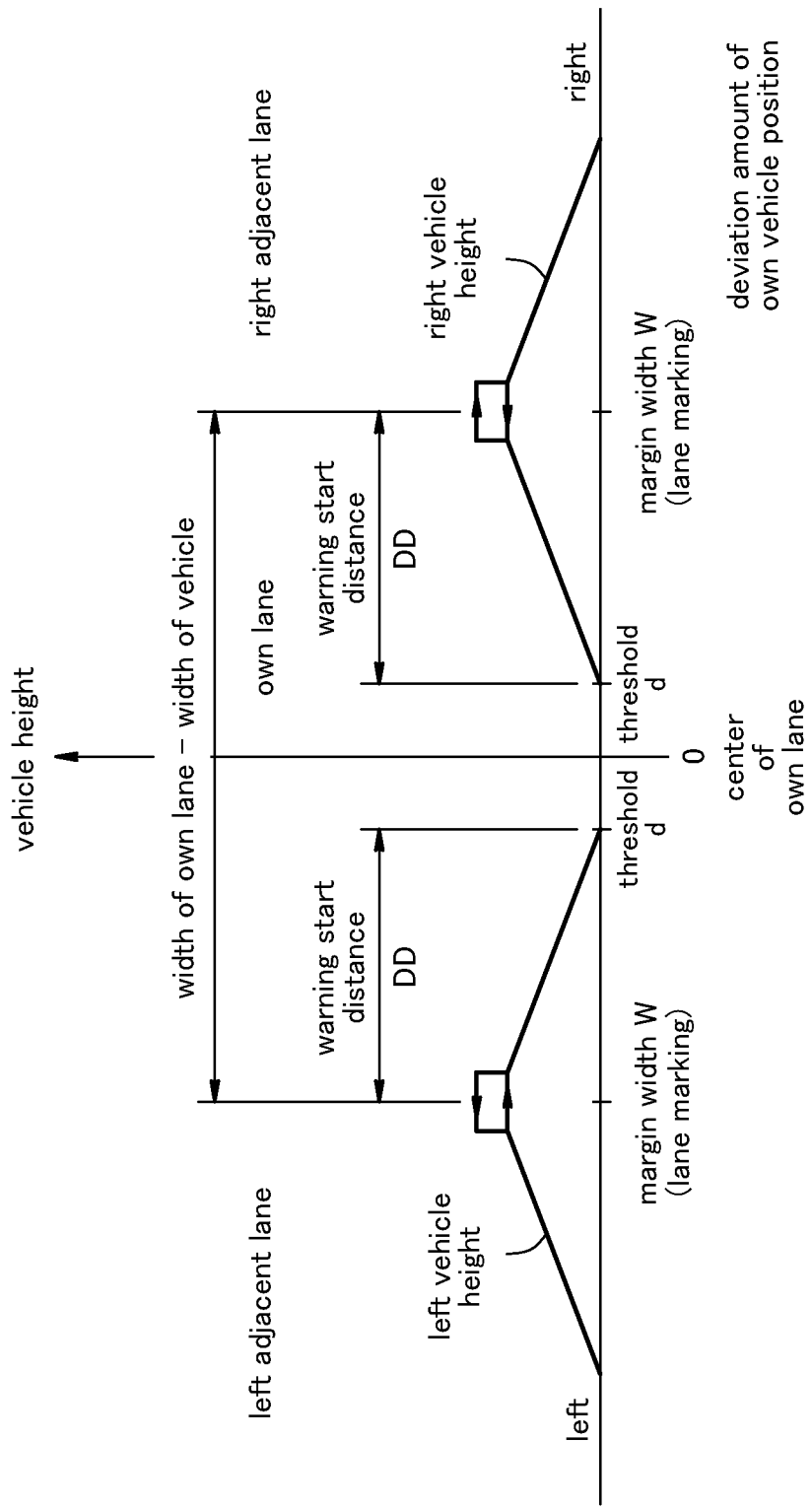
FIG. 5A is a vehicle height map used in the first lane condition.
Figure 5B:
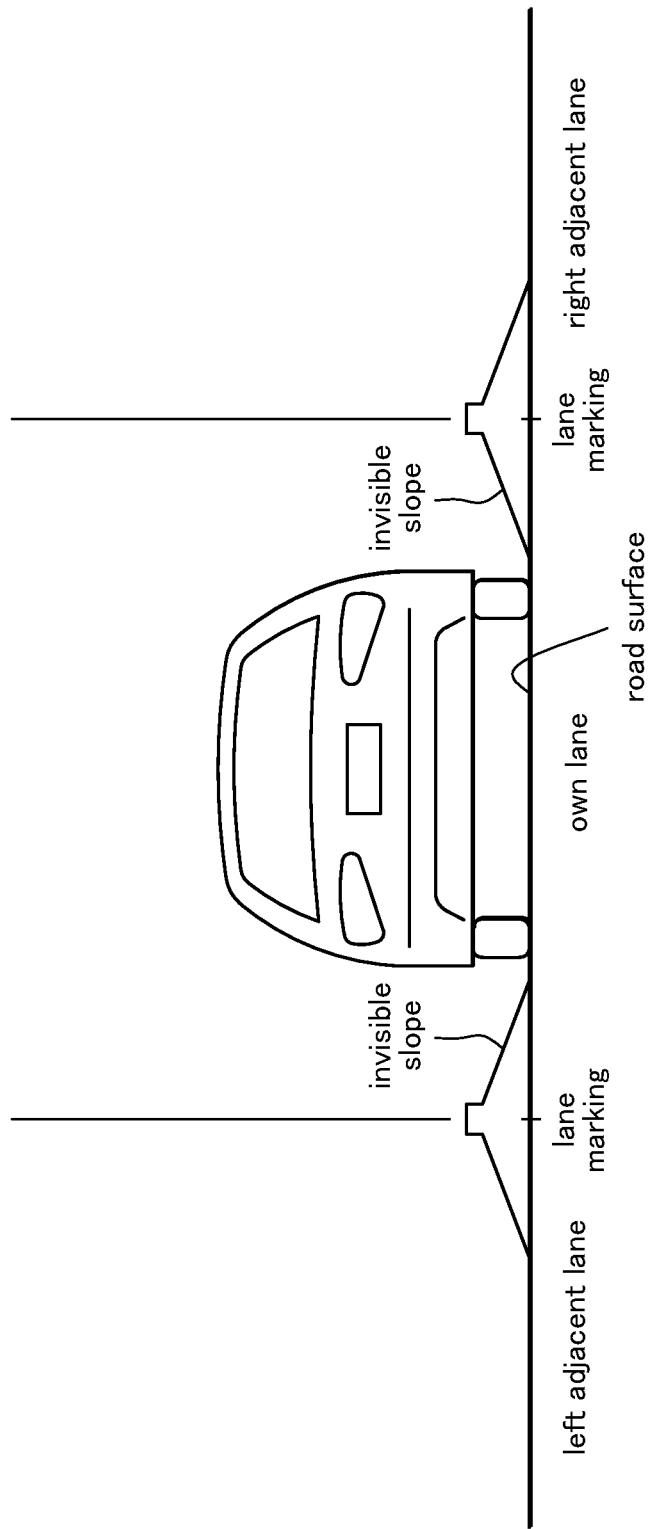
FIG. 5B is a rear view showing a road surface condition felt by a driver in the first lane condition.

FIG. 5A shows a vehicle height map used in the first lane condition, and FIG. 5B shows a road surface condition felt by the driver during the LDW roll control using the vehicle height map shown in FIG. 5A. As shown in FIG. 5A, the horizontal axis of the vehicle height map indicates the deviation amount of the own vehicle position from the center of the own lane. The vertical axis of the vehicle height map indicates the vehicle height of the vehicle body 2. The vehicle height of the vehicle body 2 on the right side (shown as "right vehicle height" in FIG. 5A) is set in an area indicating the deviation of the own vehicle position to the right side, and the vehicle height of the vehicle body 2 on the left side (shown as "left vehicle height" in FIG. 5A) is set in an area indicating the deviation of the own vehicle position to the left side. The threshold d of the deviation amount is the same on the left side and the right side.

In an area where (the absolute value of) the deviation amount is equal to or more than the threshold d and equal to or less than the margin width W, the vehicle height on a side near the one of the lane markings approached by the vehicle 1 is set to increase as the deviation amount increases. The amount of change (inclination) of the vehicle height with respect to the deviation amount may be set according to the above warning start distance DD, and may be set such that the vehicle height reaches a prescribed value at the deviation amount at which the vehicle 1 climbs onto the lane marking (the margin width W≈the threshold d+the warning start distance DD). The vehicle height on a side remote from the one of the lane markings approached by the vehicle 1 is set to zero (initial value) even if the deviation amount increases. Therefore, as the vehicle 1 approaches one of the left and right lane markings in the own lane, the vehicle height of the vehicle body 2 on the side near the one of the left and right lane markings becomes greater than the vehicle height of the vehicle body 2 on a side remote from the one of the left and right lane markings, and thereby (the absolute value of) the roll angle increases.

The vehicle height on the side near the one of the left and right lane markings is set to decrease as the deviation amount increases, in an area where (the absolute value of) the deviation amount is equal to or more than the margin width W, namely in an area where one of the wheels 4 of the vehicle 1 enters the adjacent lane.

Also, the vehicle height on the side near the one of the left and right lane markings increases rapidly at a value immediately before the deviation amount reaches the margin width W (a value slightly smaller than the margin width W: hereinafter referred to as "first value") and decreases rapidly at a value immediately after the deviation amount reaches the margin width W (a value slightly larger than the margin width W: hereinafter referred to as "second value"), when (the absolute value of) the deviation amount increases. The slight value between the margin width W and the first and second values may be set to about half of the tire width of each wheel 4, or may be set to about half of the value obtained by adding the width of the one of the left and right lane markings to the tire width.

That is, the first value is a value at which one of the wheels 4 of the vehicle 1 climbs onto one of the lane markings. When the deviation amount reaches the first value, one of the wheels 4 on one lateral side climbs onto one of the lane markings on a corresponding side. Therefore, in a case where the vehicle position estimation unit 33 estimates that one of the wheels 4 on one lateral side climbs onto one of the lane markings on a corresponding side, the vehicle height and the roll angle on the one lateral side increase.

Also, the second value is a value at which one of the wheels 4 that has climbed onto one of the lane markings climbs over the one of the lane markings. When the deviation amount reaches the second value, one of the wheels 4 on one lateral side climbs over one of the lane markings on a corresponding side. Therefore, in a case where the vehicle position estimation unit 33 estimates that one of the wheels 4 on one lateral side climbs onto and then climbs over one of the lane markings on a corresponding side, the vehicle height and the roll angle on the one lateral side decrease.

On the other hand, the vehicle height on the side near the one of the left and right lane markings does not increase rapidly at a value immediately before the deviation amount decreases to the margin width W and does not decrease rapidly at a value immediately after the deviation amount decreases to the margin width W, when (the absolute value of) the deviation amount decreases. That is, a hysteresis is set for the vehicle height on the side near the one of the left and right lane markings such that the value of the vehicle height when the deviation amount increases is different from that of the vehicle height when the deviation amount decreases. Therefore, the vehicle heights on both lateral sides do not change in a case where the vehicle position estimation unit 33 estimates that the one of the wheels 4 on the one lateral side climbs over and then climbs again onto the one of the lane markings to return to the own lane.

As described above, the vehicle height on the side remote from the one of the lane markings is set to zero (initial value) even if the deviation amount increases. Therefore, when the deviation amount reaches a value indicating that another of the wheels 4 on another lateral side climbs onto the one of the lane markings or when the deviation amount reaches a value indicating that another of the wheels 4 on another lateral side climbs over the one of the lane markings (when the entirety of the vehicle 1 moves to the adjacent lane), the vehicle heights on both lateral sides do not change. The vehicle height map used in the first lane condition is set as described above.

As described above, the roll control unit 35 increases the roll angle based on the vehicle height map such that, as the vehicle 1 approaches one lateral end of the own lane, the vehicle height on a side near the one lateral end of the own lane becomes greater than the vehicle height on a side remote therefrom. Accordingly, the vehicle body 2 rolls, and the seat surface 27A of the occupant seat 27 tilts with respect to the lateral direction according to the roll of the vehicle body 2. Therefore, as shown in FIG. 5B, the driver feels as if the own lane might have a crossing slope (namely, lateral slope) that becomes higher toward the one lateral end of the own lane. Thereby, the driver can intuitively recognize that the vehicle 1 is likely to depart from the own lane when the vehicle 1 approaches the one lateral end of the own lane.

Also, in a case where the vehicle position estimation unit 33 estimates that one of the wheels 4 on the one lateral side climbs onto one of the lane markings on a corresponding side, the roll control unit 35 increases the roll angle such that the vehicle height on the one lateral side increases. Accordingly, when the one of the wheels 4 on the one lateral side climbs onto the one of the lane markings, the driver feels as if this wheel 4 might climb onto a lane marking that has a certain height. Thereby, the driver can intuitively recognize that this wheel 4 departs from the own lane and climbs onto the lane marking.

Also, in a case where the vehicle position estimation unit 33 estimates that the one of the wheels 4 on the one lateral side climbs onto and then climbs over the one of the lane markings provided between the own lane and the adjacent lane, the roll control unit 35 decreases the roll angle such that the vehicle height on the one lateral side decreases. Accordingly, when the one of the wheels 4 on the one lateral side climbs over the one of the lane markings and moves to the adjacent lane, the driver feels as if this wheel might climb over a lane marking that has a certain height. Thereby, the driver can intuitively recognize that this wheel climbs over the lane marking.

In a case where the vehicle position estimation unit 33 estimates that the one of the wheels 4 on the one lateral side climbs over and then climbs again onto the one of the lane markings to return to the own lane, the roll control unit 35 does not change the vehicle height on both lateral sides. Accordingly, in a case where the vehicle 1 enters the adjacent lane and then returns to the own lane (original lane) without changing lanes, the vehicle body 2 does not roll when the one of the wheels 4 on the one lateral side climbs over the one of the lane markings such as a lane boundary line. Thereby, the driver does not feel bothered.

The roll control unit 35 does not change the vehicle height on both lateral sides in a case where the vehicle position estimation unit 33 estimates that the one of the wheels 4 on the one lateral side climbs onto and then climbs over the one of the lane markings, and then another of the wheels 4 on another lateral side climbs onto the one of the lane markings. Accordingly, in a case where the driver intentionally changes lanes, the vehicle body 2 does not roll when another of the wheels 4, which climbs over the one of the lane markings after the one of the wheels 4, climbs onto the one of the lane markings. Thereby, the driver does not feel bothered.

Figure 6A:
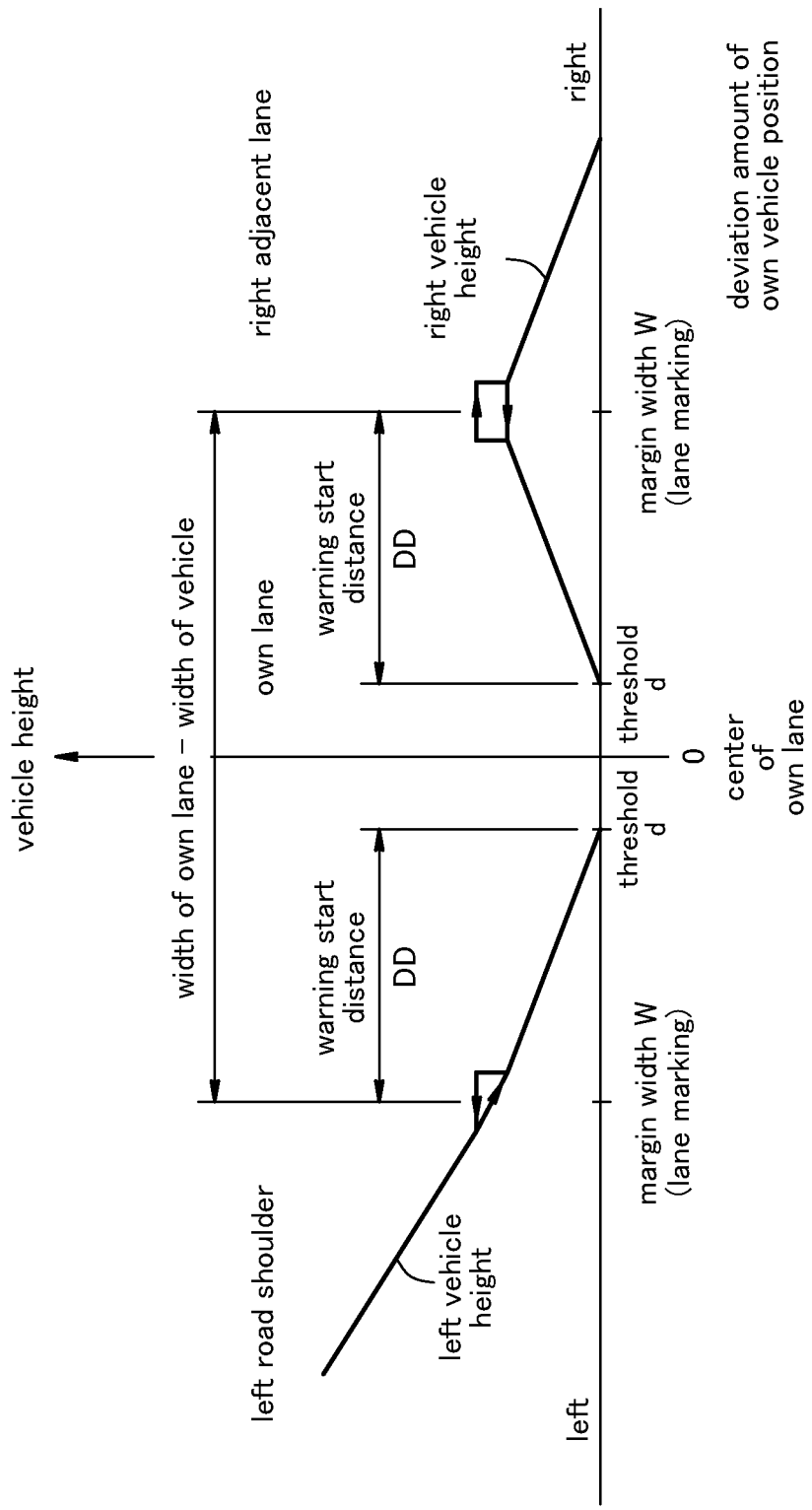
FIG. 6A is a vehicle height map used in the second lane condition.
Figure 6B:
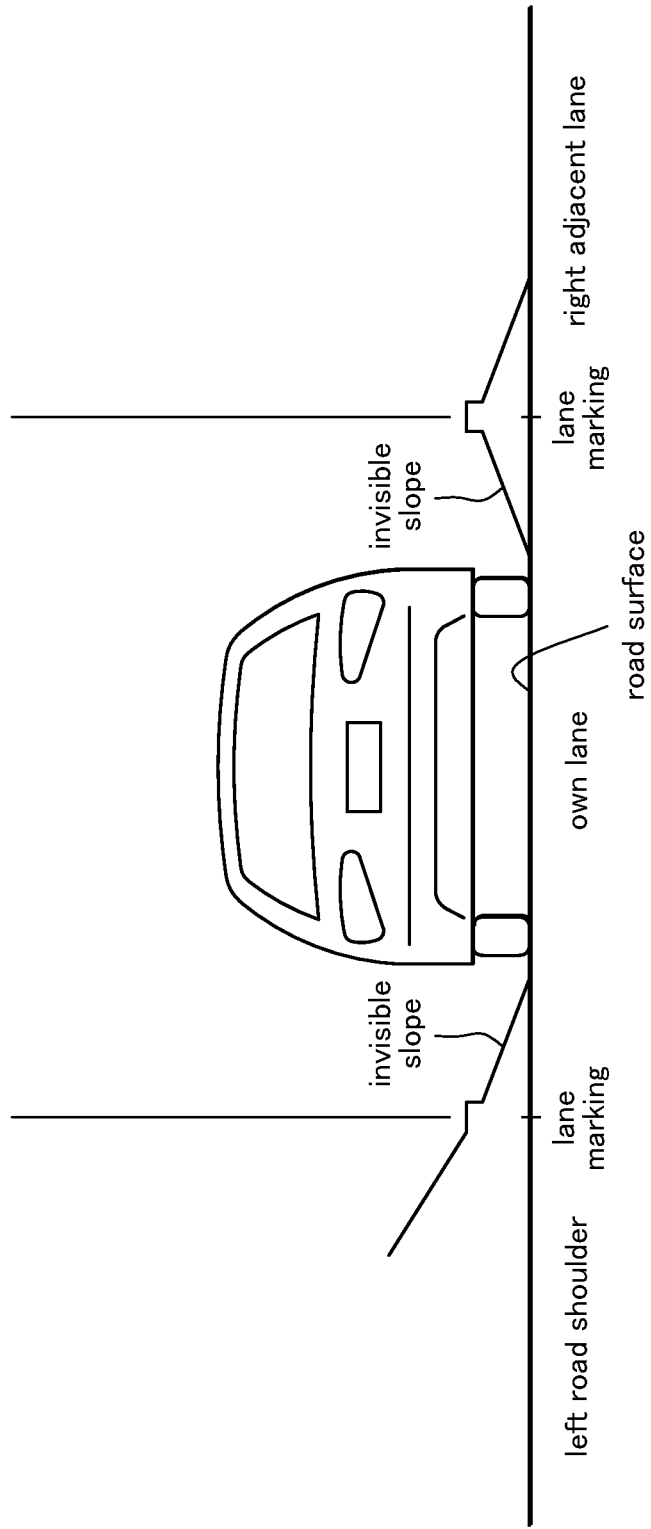
FIG. 6B is a rear view showing the road surface condition felt by the driver in the second lane condition.

FIG. 6A shows a vehicle height map used in the second lane condition, and FIG. 6B shows a road surface condition felt by the driver during the LDW roll control using the vehicle height map shown in FIG. 6A. As shown in FIG. 6A, in this vehicle height map, a left vehicle height (vehicle height on the left side adjacent to a left road shoulder) increases as the deviation amount increases in an area where (the absolute value of) the deviation amount is equal to or more than the margin width W, namely in an area where one of the wheels 4 of the vehicle 1 enters the left road shoulder. An inclination of the vehicle height (a changing amount of the vehicle height per unit deviation amount) in this area is larger than that of the vehicle height in an area where the deviation amount is equal to or more than the threshold d and equal to or less than the margin width W. Therefore, as shown in FIG. 6B, the driver feels as if the left road shoulder might have a crossing slope that becomes higher toward the left end thereof.

Figure 7A:
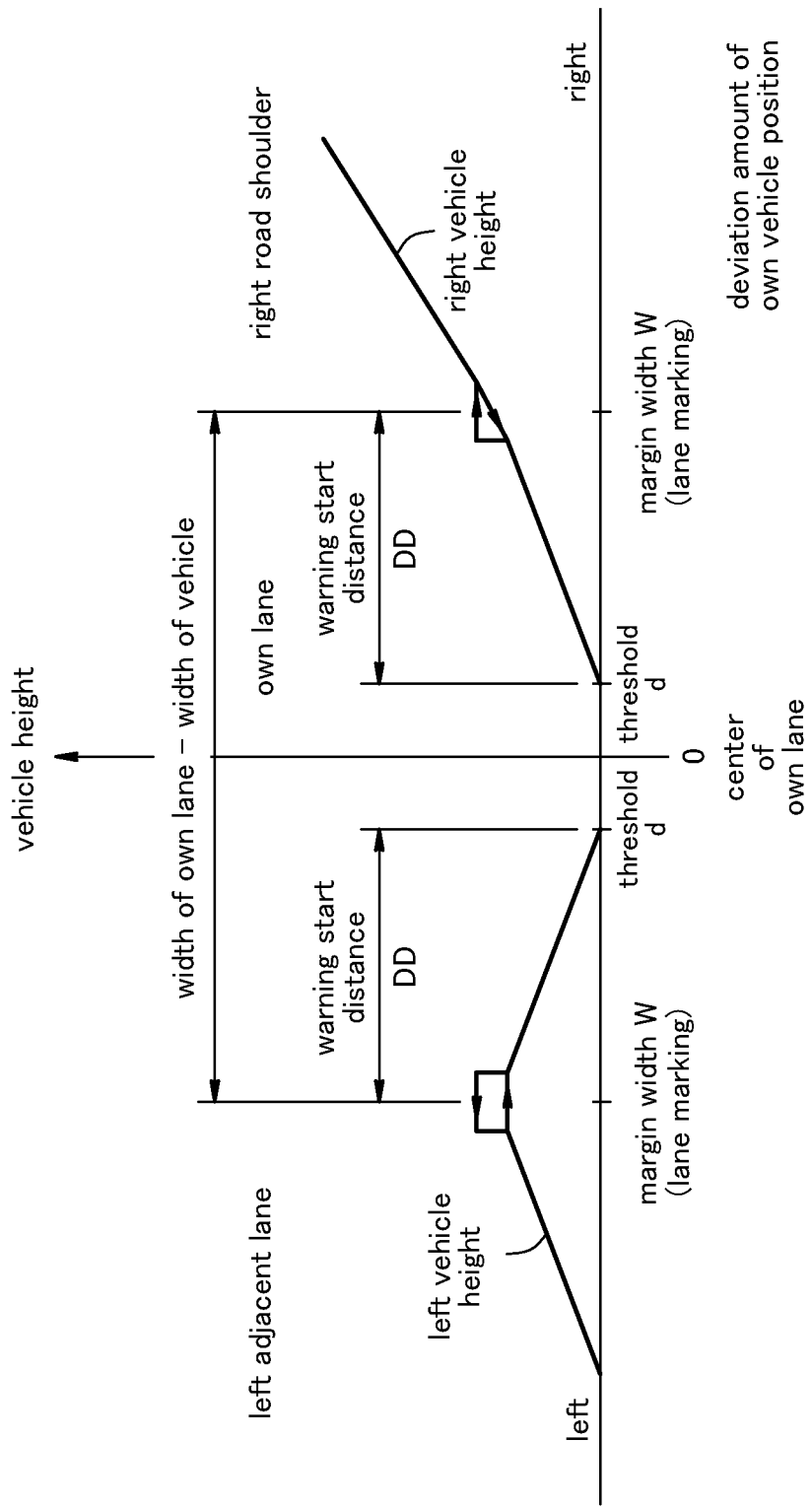
FIG. 7A is a vehicle height map used in the third lane condition.
Figure 7B:
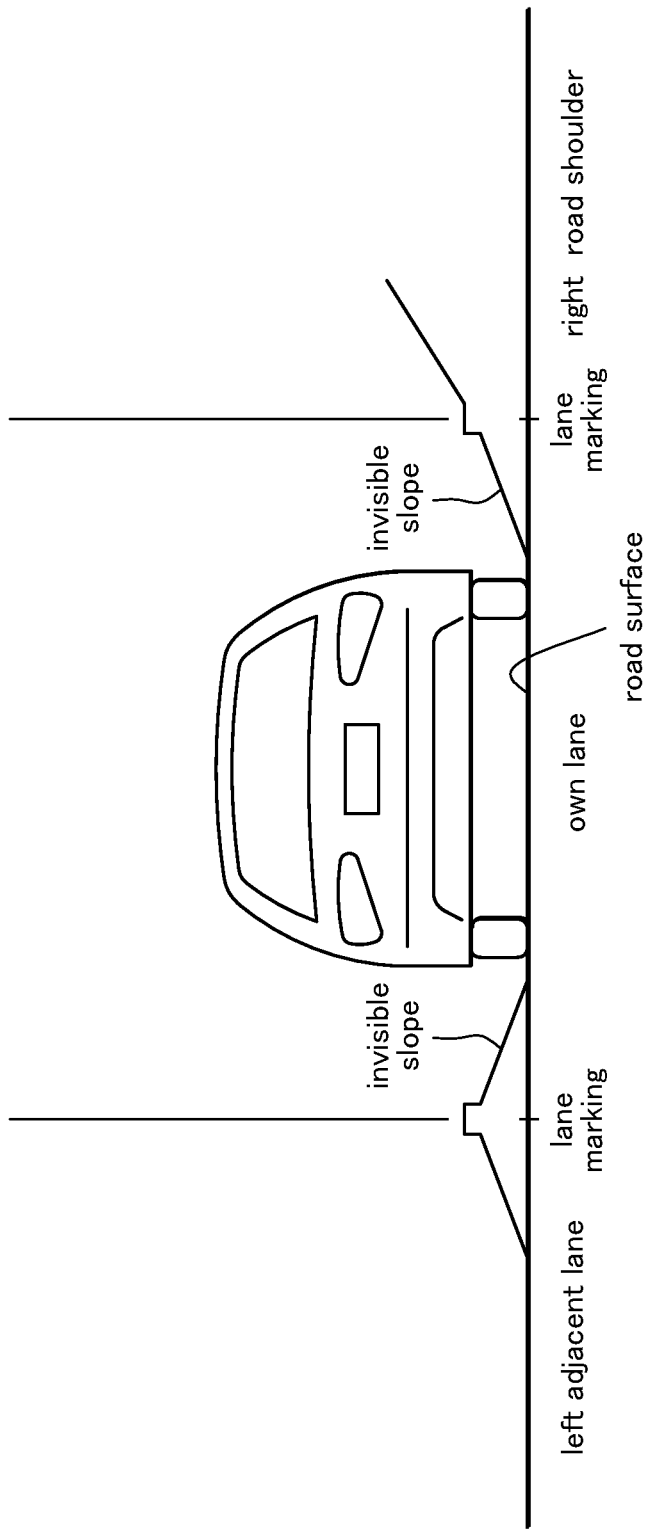
FIG. 7B is a rear view showing the road surface condition felt by the driver in the third lane condition.

FIG. 7A shows a vehicle height map used in the third lane condition, and FIG. 7B shows a road surface condition felt by the driver during the LDW roll control using the vehicle height map shown in FIG. 7A. As shown in FIG. 7A, in this vehicle height map, a right vehicle height (vehicle height on the right side adjacent to a right road shoulder) increases as the deviation amount increases in an area where (the absolute value of) the deviation amount is equal to or more than the margin width W, namely in an area where one of the wheels 4 of the vehicle 1 enters the right road shoulder. An inclination of the vehicle height (a changing amount of the vehicle height per unit deviation amount) in this area is larger than that of the vehicle height in an area where the deviation amount is equal to or more than the threshold d and equal to or less than the margin width W. Therefore, as shown in FIG. 7B, the driver feels as if the right road shoulder might have a crossing slope that becomes higher toward the right end thereof.

As described above, in a case where the vehicle position estimation unit 33 estimates that the vehicle 1 enters the road shoulder, the roll control unit 35 increases the roll angle based on the vehicle height map such that the vehicle height on a side of the road shoulder becomes greater as an entry amount of the vehicle 1 into the road shoulder becomes greater. Accordingly, the driver can intuitively recognize that the vehicle 1 should return to the own lane (namely, original lane).

Figure 8A:
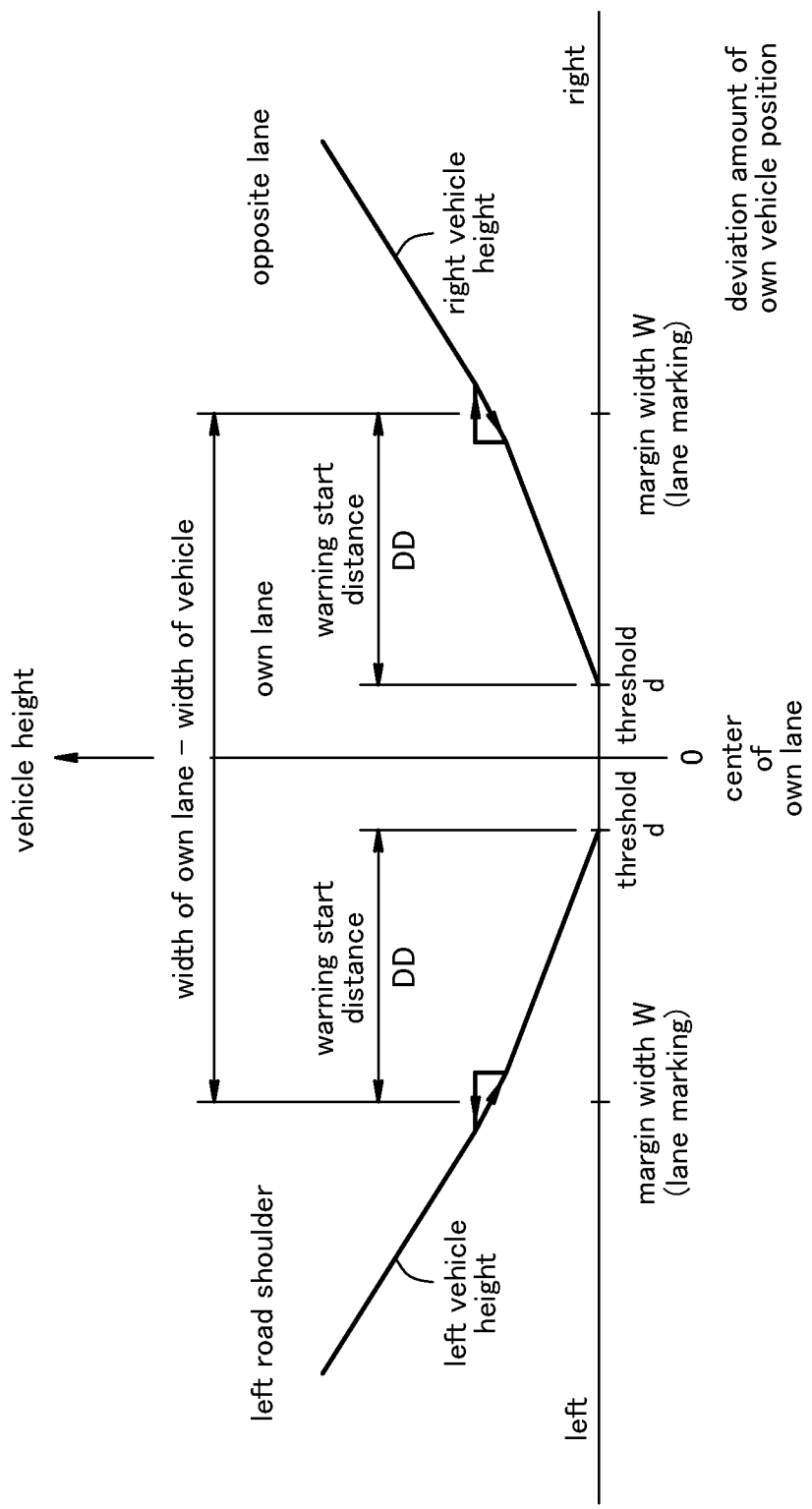
FIG. 8A is a vehicle height map used in the fourth lane condition.

FIG. 8A shows a vehicle height map used in the fourth lane condition, and FIG. 8B shows a road surface condition felt by the driver during the LDW roll control using the vehicle height map shown in FIG. 8A. As shown in FIG. 8A, in this vehicle height map, the vehicle height increases as the deviation amount increases in an area where (the absolute value of) the deviation amount is equal to or more than the margin width W, namely in an area where one of the wheels 4 of the vehicle 1 enters a left road shoulder or a right opposite lane (or right road shoulder). An inclination of the vehicle height (a changing amount of the vehicle height per unit deviation amount) in this area is larger than that of the vehicle height in an area where the deviation amount is equal to or more than the threshold d and equal to or less than the margin width W. Therefore, as shown in FIG. 8B, the driver feels as if the left road shoulder might have a crossing slope that becomes higher toward the left end thereof and the right opposite lane (or right road shoulder) might have a crossing slope that becomes higher toward the right end thereof.

As described above, in a case where the vehicle position estimation unit 33 estimates that the vehicle 1 enters the opposite lane, the roll control unit 35 increases the roll angle such that the vehicle height on a side of the opposite lane becomes greater as an entry amount of the vehicle 1 into the opposite lane becomes greater. Accordingly, the driver can intuitively recognize that the vehicle 1 should return to the own lane (namely, original lane).

Figure 9:
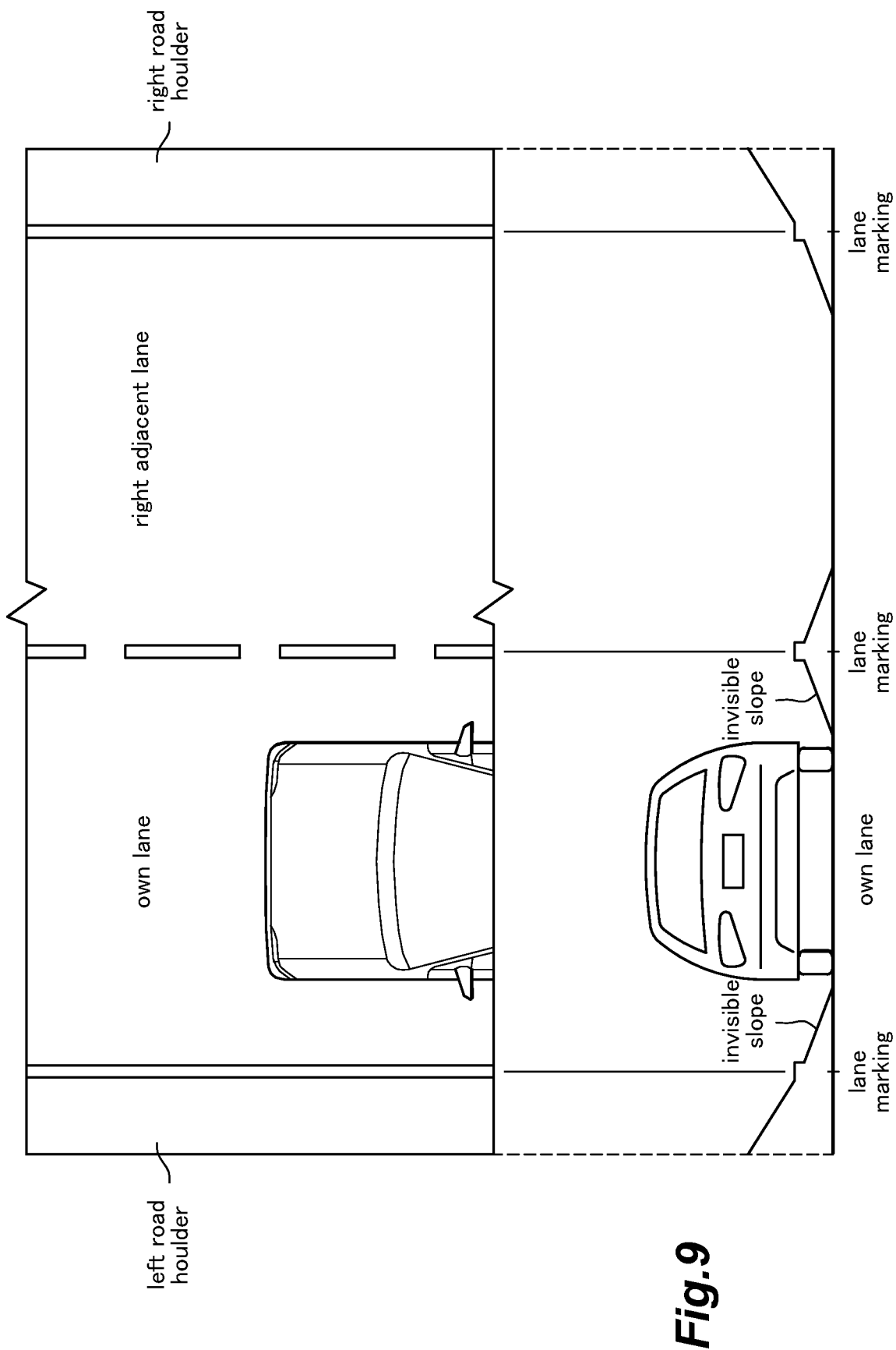
FIG. 9 is a combination diagram showing a plan view of the second lane condition in an upper part and the road surface condition felt by the driver in the second lane condition in a lower part.

An upper part of FIG. 9 shows a plan view of the second lane condition and a lower part of FIG. 9 shows the road surface condition felt by the driver in the second lane condition. The roll control unit 35 sets the vehicle height as described above, so that the driver feels as if the road in which the vehicle 1 is traveling might have invisible slopes shown in the lower part of FIG. 9.

Figure 10A:
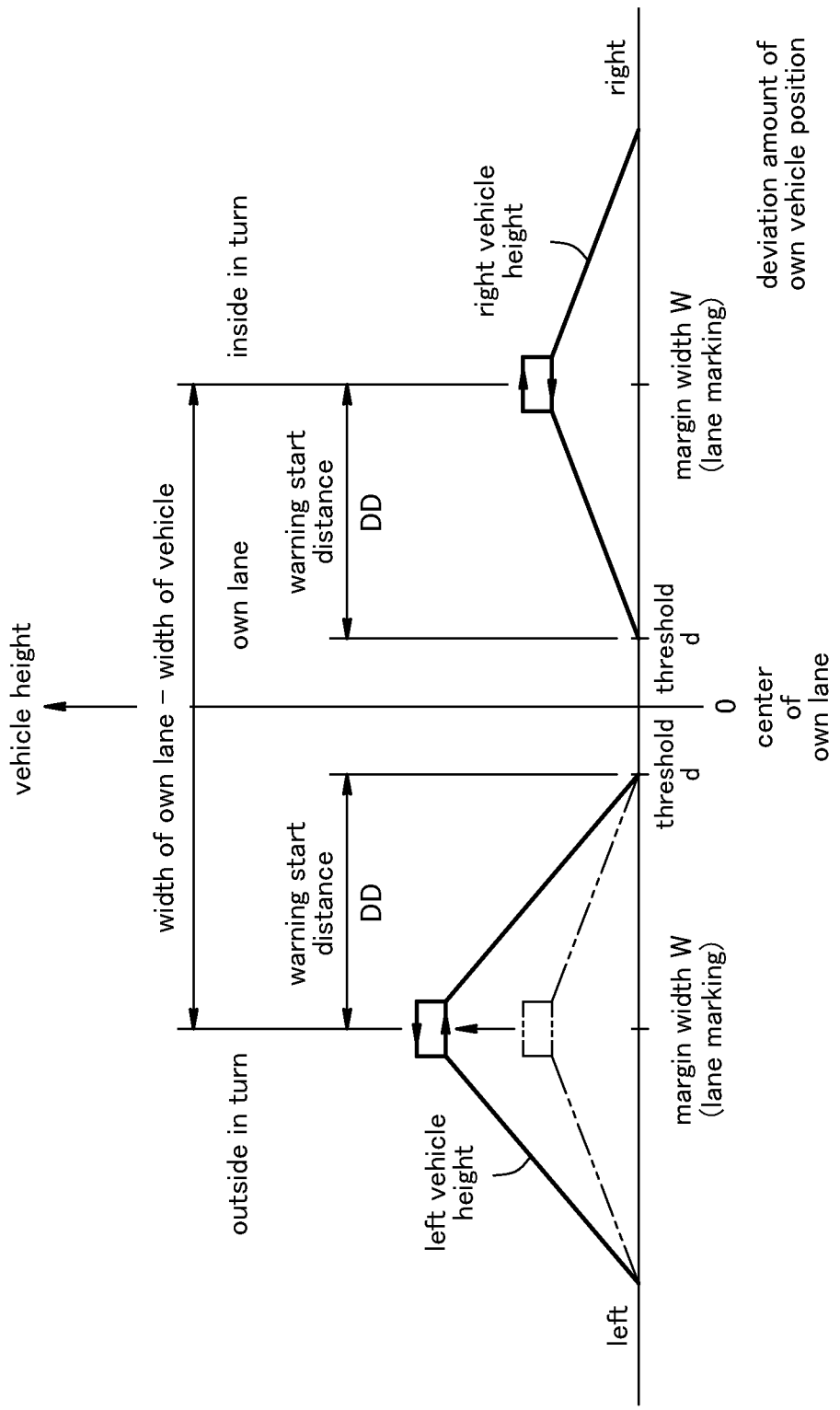
FIG. 10A is a vehicle height map used in the first lane condition when a vehicle turns right.
Figure 10B:
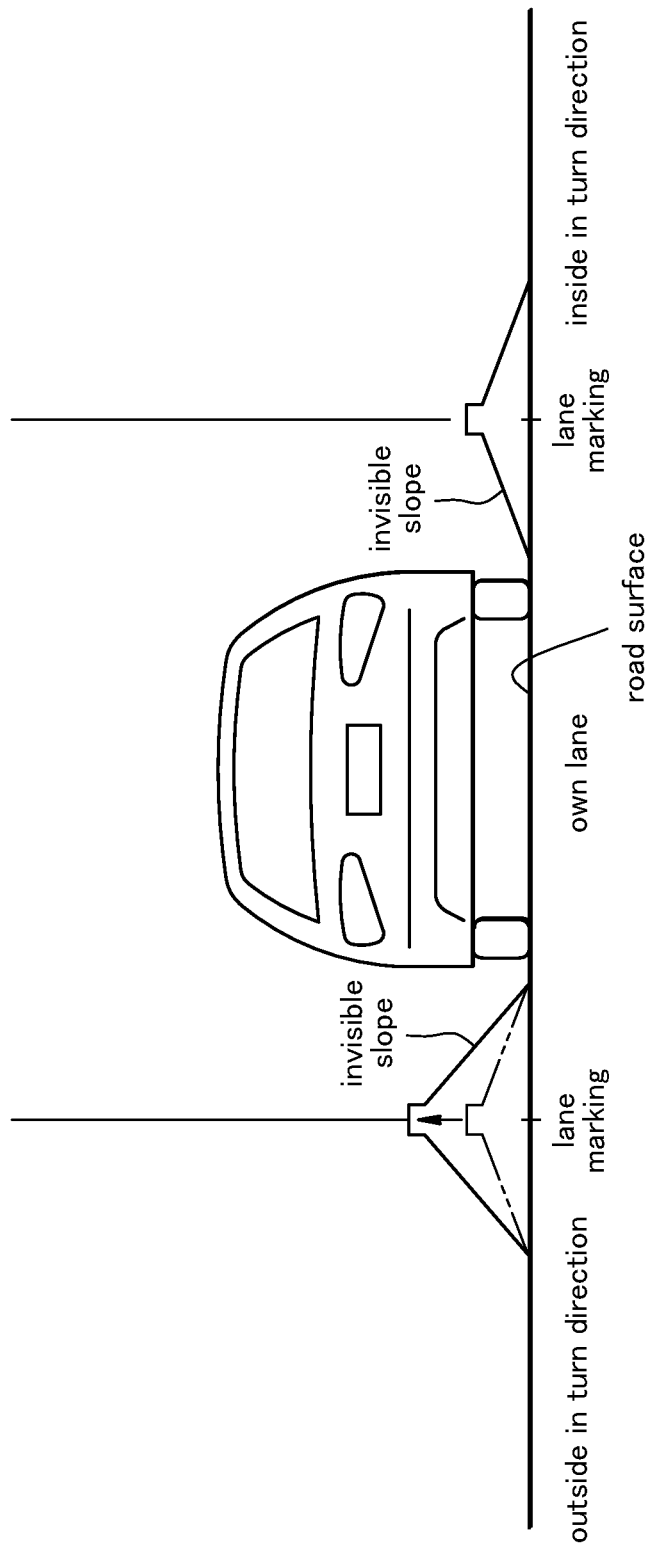
FIG. 10B is a rear view showing the road surface condition felt by the driver in the first lane condition when the vehicle turns right.

FIG. 10A is a vehicle height map used in the first lane condition when a vehicle 1 turns right, and FIG. 10B is a rear view showing the road surface condition felt by the driver in the first lane condition when the vehicle turns right. In a case where the turn information obtained in step ST1 of FIG. 3 indicates the right turn of the vehicle 1, the roll control unit 35 corrects the vehicle height map shown in FIG. 5A to the vehicle height map shown in FIG. 10A (see step ST3). Specifically, the roll control unit 35 corrects the left vehicle height on the outside of the turn of the vehicle 1 to be larger than the value shown in FIG. 5A. The corrected left vehicle height may be a value obtained by multiplying the left vehicle height shown in FIG. 5A by a constant, or may be a value obtained by multiplying the left vehicle height shown in FIG. 5A by a valuable corresponding to the lateral acceleration generated by the turn of the vehicle 1, for example.

As described above, in a case where the turn detection unit 31 detects the turn of the vehicle 1, the roll control unit 35 increases the roll angle such that the vehicle height on the outside of the turn of the vehicle 1 becomes greater than the vehicle height on the inside thereof. Accordingly, as shown in FIG. 10B, the driver feels as if the own lane might have a greater crossing slope on the outside of the turn than the inside thereof. Thereby, the driver can intuitively recognize that the vehicle 1 is likely to depart from the own lane to the outside of the turn when the vehicle 1 approaches the one lateral end of the own lane on the outside of the turn.

As described above, in a case where the intent determination unit 36 determines that the driver has the lane change intent, the roll control unit 35 ends the LDW roll control. Therefore, the LDW roll control by the roll control unit 35 is canceled in a case where the driver intentionally changes lanes (for example, in a case where the driver operates the turn signal lever 18 or operates the steering wheel 13 strongly). Thereby, the vehicle body 2 does not roll according to the own vehicle position, so that the driver does not feel bothered.

In the present embodiment, the four active dampers 9 as the roll angle changing device compose a tilt angle changing device that changes the tilt angle of the seat surface 27A of the occupant seat 27 with respect to the lateral direction, and the roll control unit 35 that controls the roll angle composes a tilt angle control unit that controls the tilt angle of the seat surface 27A of the occupant seat 27. Accordingly, not only the seat surface 27A of the occupant seat 27 but also the entire vehicle body 2 tilts laterally with respect to the road. Thereby, the driver surely feels as if the own lane might have a crossing slope that becomes higher toward the one lateral end of the own lane.

MODIFICATION

Figure 11A:
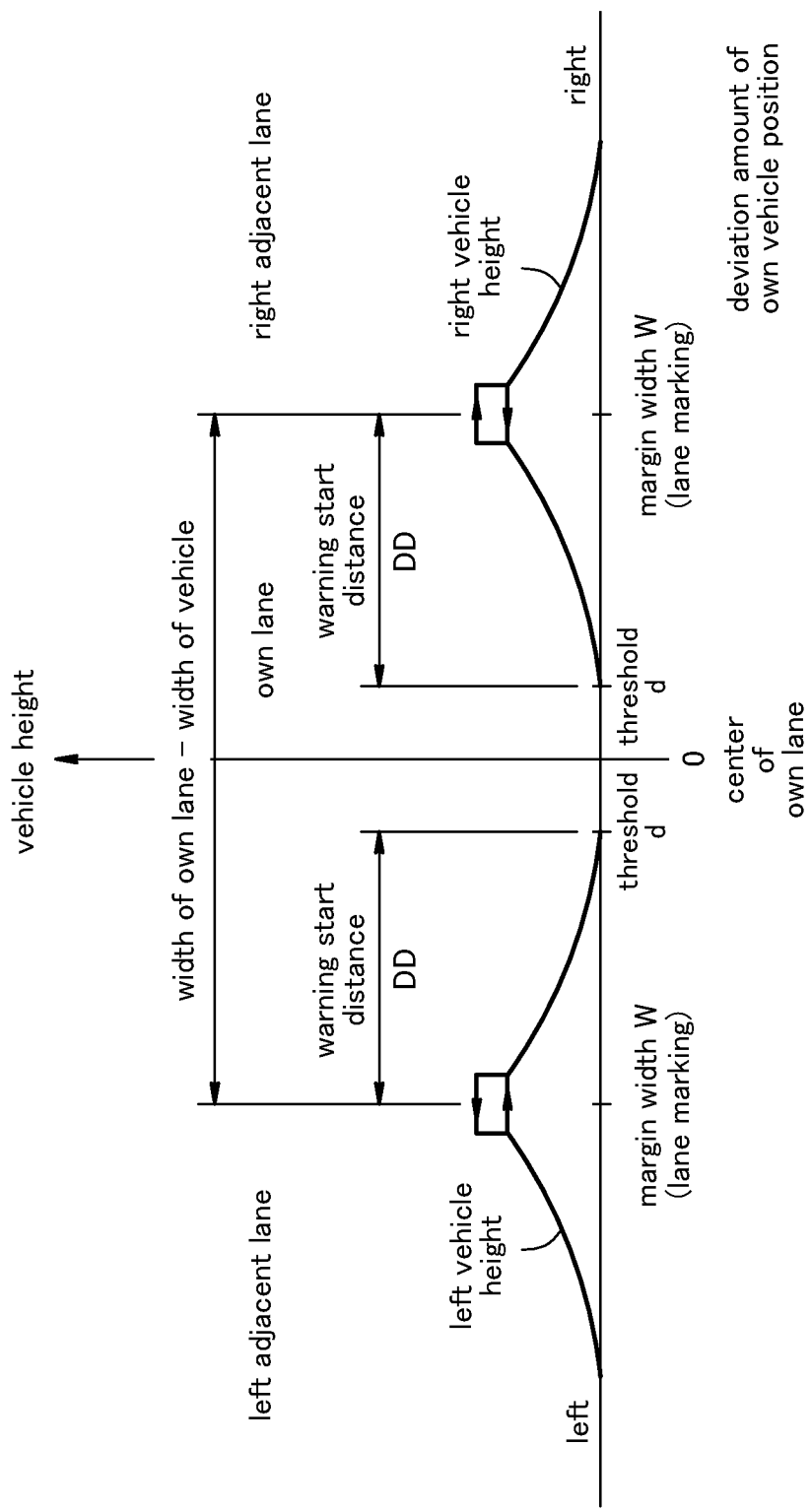
FIG. 11A is a vehicle height map used in a first lane condition according to a modification.
Figure 11B:
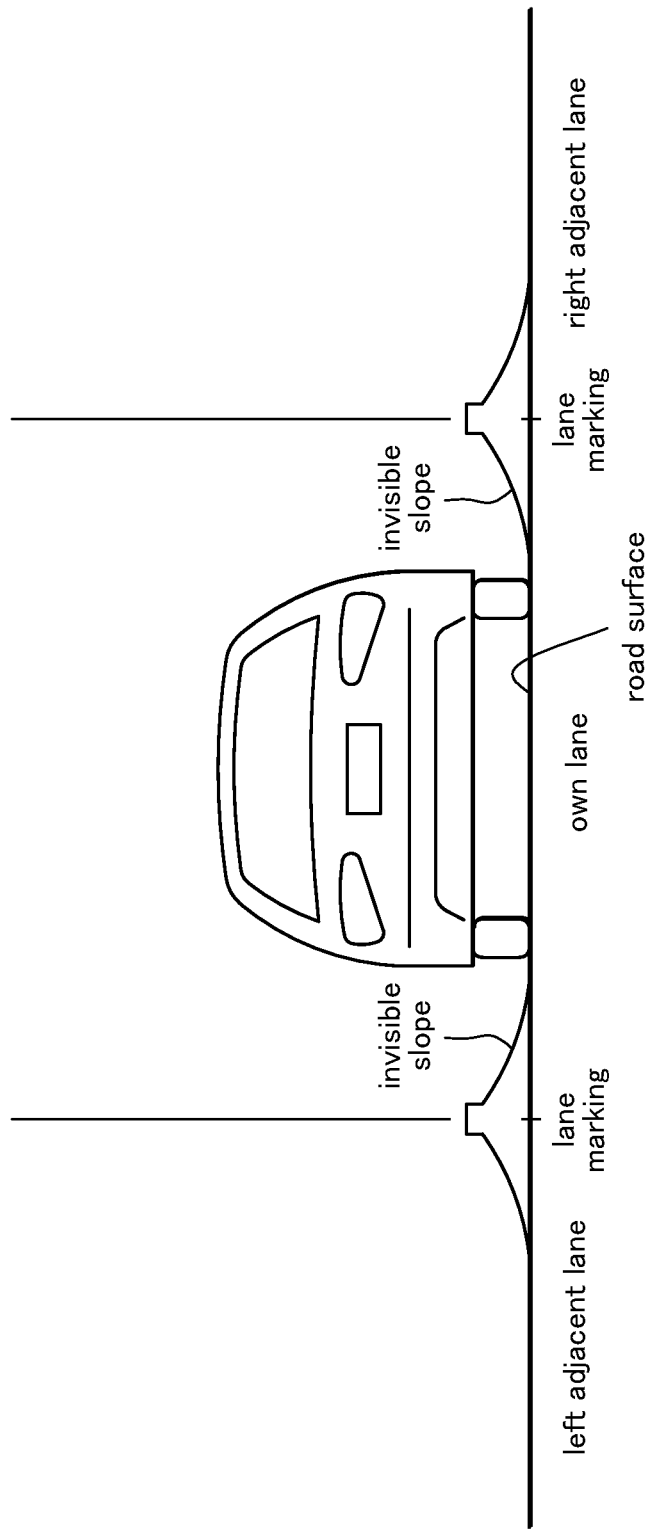
FIG. 11B is a rear view showing a road surface condition felt by a driver in the first lane condition according to the modification.

FIG. 11A is a vehicle height map used in the first lane condition according to a modification, and FIG. 11B is a rear view showing a road surface condition felt by a driver in the first lane condition according to the modification. The vehicle height map does not have to be set as described above, but may be set as shown in FIG. 11A. In this vehicle height map, the inclination of the vehicle height (a changing amount of the vehicle height per unit deviation amount) increases as the deviation amount increases. Therefore, as shown in FIG. 11B, the driver feels as if the own lane has a crossing slope that becomes steeper toward the one lateral end of the own lane. Thereby, the driver can more intuitively recognize that the vehicle 1 is likely to depart from the own lane, when the vehicle 1 approaches the one lateral end of the own lane.

Second Embodiment

Next, a second embodiment of the present invention will be described with reference to FIGS. 12 to 14. Elements of the second embodiment that are the same as or similar to those of the first embodiment are given the same reference numerals as the first embodiment, and descriptions of the second embodiment that may duplicate those of the first embodiment are omitted.

Figure 12:
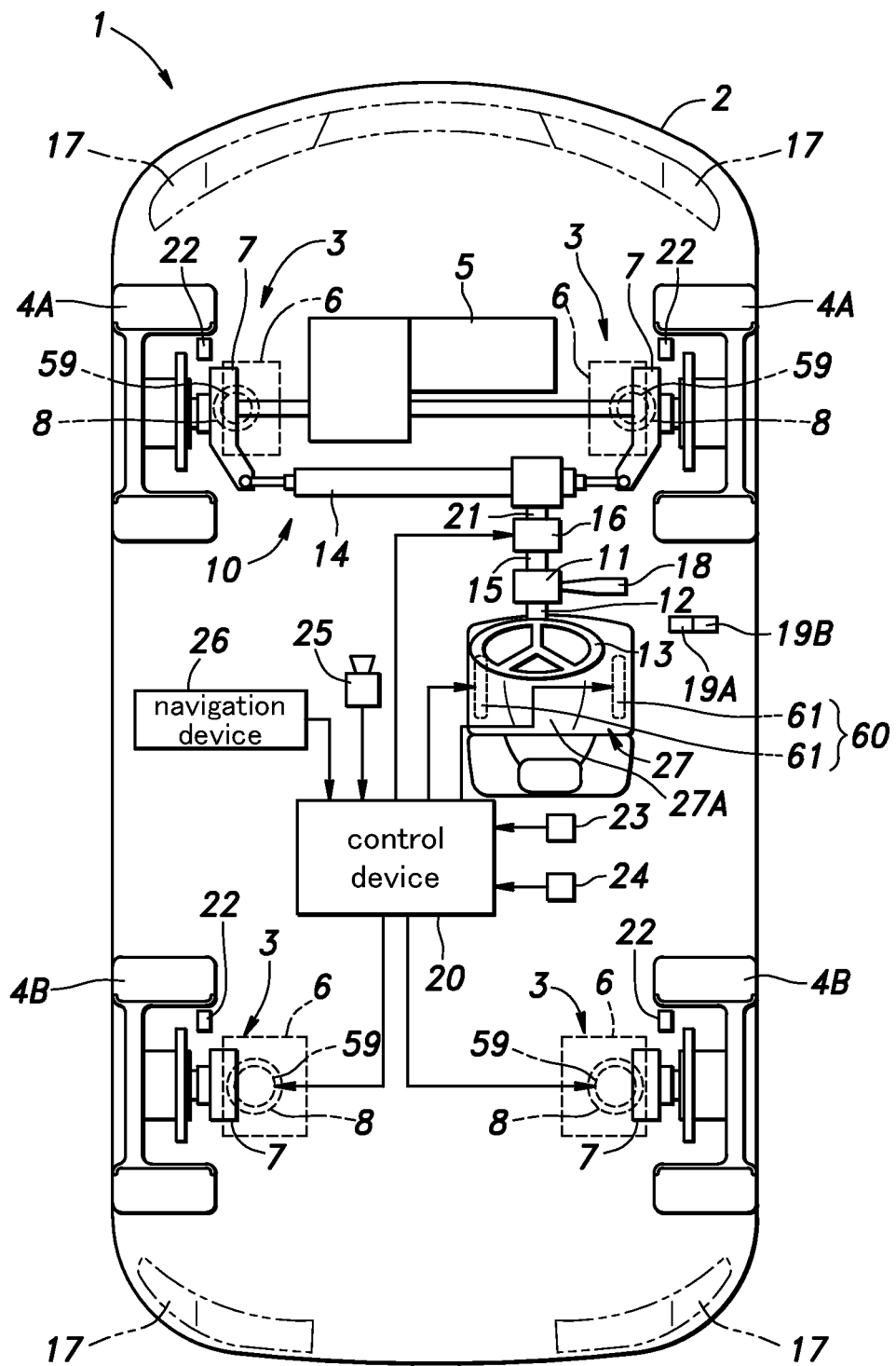
FIG. 12 is a schematic diagram of a vehicle provided with a lane departure prevention assist system according to a second embodiment.
Figure 13:
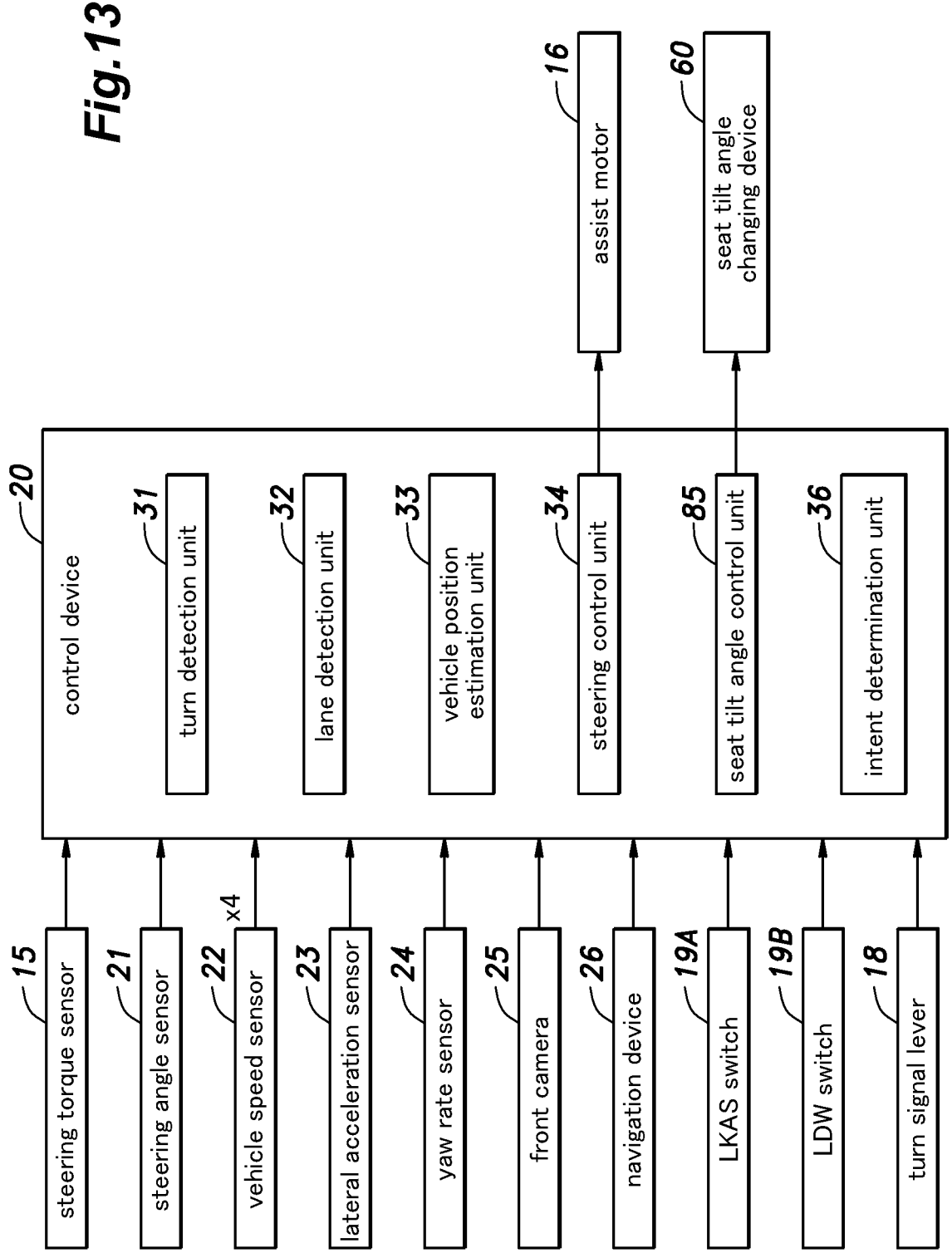
FIG. 13 is a functional block diagram of a control device shown in FIG. 12.

FIG. 12 is a schematic diagram of a vehicle 1 provided with a lane departure prevention assist system according to the second embodiment. As shown in FIG. 12, each suspension device 3 includes a damper 59 provided between the vehicle body 2 and the suspension arm 6. The vehicle 1 includes four dampers 59 in total. Each damper 59 may be a semi-active damper (passive damper) that can vary the damping force but cannot vary a vehicle height, or a damper that cannot change the damping force. Each damper 59 may be an active damper similar to the first embodiment.

The occupant seat 27 is mounted to the vehicle body 2 via a seat tilt angle changing device 60. The seat tilt angle changing device 60 is provided between the vehicle body 2 and the occupant seat 27, and is configured to change the tilt angle of the occupant seat 27 with respect to the lateral direction. In the present embodiment, the seat tilt angle changing device 60 includes a pair of height adjusting mechanisms 61 provided on left and right lower parts of the occupant seat 27.

The control device 20 is provided in the vehicle 1 to perform lane departure prevention assistance, and controls driving of the seat tilt angle changing device 60, the assist motor 16, and the like. FIG. 13 is a functional block diagram of the control device 20 shown in FIG. 12. As shown in FIG. 13, the control device 20 includes a seat tilt angle control unit 85 instead of the roll control unit 35 shown in FIG. 2.

The seat tilt angle control unit 85 executes Lane Departure Warning tilt angle control (LDW tilt angle control) when the LDW switch 19B is on. The LDW tilt angle control is executed for warning the driver by controlling the tilt angle of the occupant seat 27 with respect to the lateral direction when the vehicle 1 departs from or is likely to depart from the own lane. In the present embodiment, the tilt angle of the occupant seat 27 with respect to the lateral direction means the tilt angle of the occupant seat 27 with respect to the lateral direction of the vehicle 1. Also, the above-mentioned control of the tilt angle includes not only direct control of the tilt angle but also indirect control of the tilt angle resulting from control of heights of the pair of height adjusting mechanisms 61 with respect to the vehicle body 2 to change the heights of the seat surface 27A of the occupant seat 27 on both lateral sides. The seat tilt angle control unit 85 does not execute the LDW tilt angle control when the LDW switch 19B is off.

The LDW tilt angle control assists prevention of a lane departure of the vehicle 1 by driving the seat tilt angle changing device 60 as the tilt angle changing device to control the tilt angle of the occupant seat 27 (heights of the seat surface 27A of the occupant seat 27 on both lateral sides) based on the own vehicle position estimated by the vehicle position estimation unit 33. The seat tilt angle control unit 85 executes the LDW tilt angle control regardless of whether the LKAS switch 19A is on or off.

In the following, the LDW tilt angle control by the seat tilt angle control unit 85 is described specifically. The seat tilt angle control unit 85 starts the following LDW tilt angle control when the LDW switch 19B is turned on, and ends the LDW tilt angle control when the LDW switch 19B is turned off. Also, the seat tilt angle control unit 85 ends the LDW tilt angle control in a case where the intent determination unit 36 determines that the driver has the lane change intent in a state where the LDW switch 19B is on. Thereafter, the seat tilt angle control unit 85 restarts the LDW tilt angle control in a case where the intent determination unit 36 determines that the driver cease to have the lane change intent. In a case where the LDW tilt angle control ends, the seat tilt angle control unit 85 returns the seat tilt angle changing device 60 to an initial position to equalize the heights of the seat surface 27A of the occupant seat 27 on both lateral sides (to reduce the tilt angle to zero).

Figure 14:
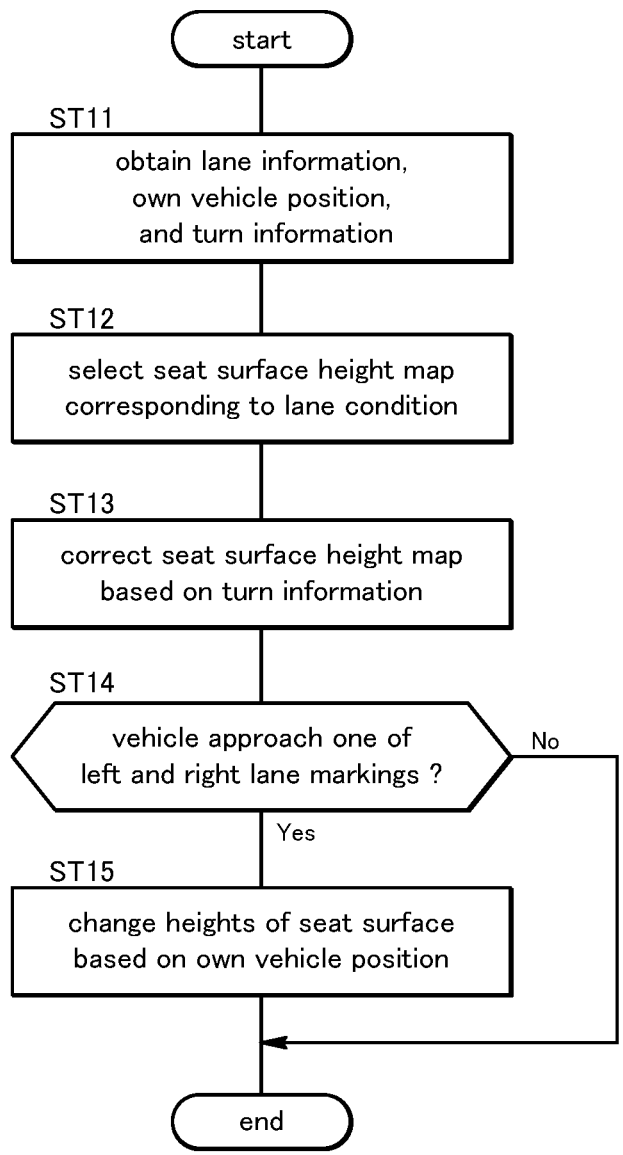
FIG. 14 is a flow chart of LDW tilt angle control by a seat tilt angle control unit shown in FIG. 13.

As shown in FIG. 14, when the LDW tilt angle control is started, the seat tilt angle control unit 85 obtains the lane information from the lane detection unit 32, obtains the own vehicle position from the vehicle position estimation unit 33, and obtains the turn information from the turn detection unit 31 (step ST11). Next, the seat tilt angle control unit 85 determines a lane condition based on the obtained lane information, and selects a seat surface height map corresponding to the lane condition (step ST12). The seat surface height map is similar to the vehicle height map shown in FIGS. 5A-8A, 10A, and 11A in the first embodiment.

After selecting the seat surface height map in step ST12, the seat tilt angle control unit 85 corrects the seat surface height map based on the turn information obtained in step ST11 (step ST13). The correction of the seat surface height map is similar to that of the vehicle height map in the first embodiment. Next, the seat tilt angle control unit 85 determines whether the vehicle 1 approaches one of the left and right lane markings based on the own vehicle position obtained in step ST11 (step ST14).

In a case where the determination in step ST14 is No, the seat tilt angle control unit 85 returns to step ST11 to repeat the above processing. On the other hand, in a case where the determination in step ST14 is Yes, the seat tilt angle control unit 85 refers to the selected seat surface height map and drives the seat tilt angle changing device 60 to change the heights of the seat surface 27A of the occupant seat 27 on both lateral sides based on the own vehicle position (step ST15). That is, the seat tilt angle control unit 85 controls the tilt angle of the occupant seat 27. Thereafter, the seat tilt angle control unit 85 returns to step ST11 to repeat the above processing.

As described above, the seat tilt angle control unit 85 increases the tilt angle of the occupant seat 27 based on the seat surface height map such that, as the vehicle 1 approaches one lateral end of the own lane, the height of the seat surface 27A on a side near the one lateral end of the own lane becomes greater than that of the seat surface 27A on a far side thereof. Accordingly, the occupant seat 27 tilts laterally. Therefore, as shown in FIG. 5B, the driver feels as if the own lane might have a crossing slope (namely, lateral slope) that becomes higher toward the one lateral end of the own lane. Thereby, the driver can intuitively recognize that the vehicle 1 is likely to depart from the own lane when the vehicle 1 approaches the one lateral end of the own lane.

In the present embodiment, the seat tilt angle changing device 60 composes the tilt angle changing device that changes the tilt angle of the occupant seat 27 with respect to the lateral direction, and also composes the seat surface tilt angle changing device that changes the tilt angle of the seat surface 27A of the occupant seat 27 with respect to the lateral direction. Also, the seat tilt angle control unit 85 composes a seat surface tilt angle control unit that drives and controls such a seat surface tilt angle changing device. Accordingly, the tilt angle changing device can be downsized or simplified. Also, the entire occupant seat 27 including a seat back tilts greatly by operating the seat tilt angle changing device 60 in a small size. Thereby, the driver can surely recognize that the vehicle 1 is likely to depart from the own lane when the vehicle 1 approaches the one lateral end of the own lane.

Concrete embodiments of the present invention have been described in the foregoing, but the present invention should not be limited by the foregoing embodiments and various modifications and alterations are possible within the scope of the present invention. For example, in the above embodiments, the vehicle height map (seat surface height map) has been described with regard to a road on which lane markings are drawn. However, a similar vehicle height map (seat surface height map) may also be applied to a road on which no lane marking is drawn.

In the second embodiment, the seat surface tilt angle changing device that changes the tilt angle of the seat surface 27A of the occupant seat 27 with respect to the lateral direction is composed of the seat tilt angle changing device 60 that tilts the entire occupant seat 27. On the other hand, the seat surface tilt angle changing device may be provided in a seat cushion of the occupant seat 27, and may be able to change the heights of the seat surface 27A on both lateral sides with respect to a seat frame. For example, the seat surface tilt angle changing device may be composed of a pair of left and right bladders (for example, a pair of left and right air bladders) that changes the height (volume) by controlling the supplied fluid pressure or a support plate that is driven to tilt left and right by an electric motor or a bladder. In this case, the tilt angle control unit that drives and controls the tilt angle changing device is composed of a seat surface tilt angle control unit that drives such a seat surface tilt angle changing device to control the tilt angle of the seat surface 27A of the occupant seat 27. By forming the lane departure prevention assist system as described above, the tilt angle changing device can be further downsized or simplified.

In addition, a specific configuration, an arrangement, a value, a procedure, and the like of each member and each portion thereof shown in the above embodiments can be changed as appropriate within the scope of the present invention. Also, the above embodiments and modifications may be combined as appropriate. Further, not all of the structural elements shown in the above embodiments are necessarily indispensable and they may be selectively adopted as appropriate.

The invention claimed is:

1. A lane departure prevention assist system for a vehicle, comprising:
    a tilt angle changing device provided between a vehicle body and wheels or between the vehicle body and a seat surface of an occupant seat and configured to change a tilt angle of the seat surface with respect to a lateral direction;
    a tilt angle control unit configured to control the tilt angle of the seat surface with respect to the lateral direction by driving the tilt angle changing device;
    a lane detection unit configured to detect a lane on a road; and
    a vehicle position estimation unit configured to estimate a lateral position of the vehicle in the lane,
    wherein the tilt angle control unit is configured to increase the tilt angle of the seat surface with respect to the lateral direction such that, as the vehicle approaches one lateral end of an own lane in which the vehicle is traveling, a height of the seat surface on a side near the one lateral end of the own lane becomes greater than the height of the seat surface on a side remote from the one lateral end of the own lane, the lane detection unit is configured to detect lane markings on the road, the tilt angle control unit is configured to increase the tilt angle of the seat surface with respect to the lateral direction such that the height of the seat surface on one lateral side increases in a case where the vehicle position estimation unit estimates that one of the wheels on the one lateral side climbs onto one of the lane markings on a corresponding side, the tilt angle control unit is configured to decrease the tilt angle of the seat surface with respect to the lateral direction such that the height of the seat surface on the one lateral side decreases in a case where the vehicle position estimation unit estimates that the one of the wheels on the one lateral side climbs onto and then climbs over the one of the lane markings provided between the own lane and an adjacent lane, and the tilt angle control unit does not increase the tilt angle of the seat surface with respect to the lateral direction such that the height of the seat surface on the one lateral side increases in a case where the vehicle position estimation unit estimates that the one of the wheels on the one lateral side climbs over and then climbs again onto the one of the lane markings to return to the own lane.

2. The lane departure prevention assist system according to claim 1, further comprising a turn detection unit configured to detect a turn of the vehicle, wherein the tilt angle control unit is configured to increase the tilt angle of the seat surface with respect to the lateral direction such that the height of the seat surface on an outside of the turn of the vehicle becomes greater.

3. The lane departure prevention assist system according to claim 1, wherein the tilt angle control unit does not change the height of the seat surface on both lateral sides in a case where the vehicle position estimation unit estimates that the one of the wheels on the one lateral side climbs onto and then climbs over the one of the one of the lane markings, and then another of the wheels on another lateral side climbs onto the one of the lane markings.

4. The lane departure prevention assist system according to claim 1, wherein the lane detection unit is configured to identify a road outside line provided between the own lane and a road shoulder, and the tilt angle control unit is configured to increase the tilt angle of the seat surface with respect to the lateral direction such that the height of the seat surface on a side of the road shoulder becomes greater as an entry amount of the vehicle into the road shoulder becomes greater in a case where the vehicle position estimation unit estimates that the vehicle enters the road shoulder.

5. The lane departure prevention assist system according to claim 1, wherein the lane detection unit is configured to identify a road center line provided between the own lane and an opposite lane, and the tilt angle control unit is configured to increase the tilt angle of the seat surface with respect to the lateral direction such that the height of the seat surface on a side of the opposite lane becomes greater as an entry amount of the vehicle into the opposite lane becomes greater in a case where the vehicle position estimation unit estimates that the vehicle enters the opposite lane.

6. The lane departure prevention assist system according to claim 1, wherein the tilt angle changing device comprises a roll angle changing device configured to change a roll angle of the vehicle body, and the tilt angle control unit comprises a roll control unit configured to control the roll angle of the vehicle body by driving the roll angle changing device.

7. The lane departure prevention assist system according to claim 1, wherein the tilt angle changing device comprises a seat surface tilt angle changing device configured to change the tilt angle of the seat surface of the occupant seat with respect to the vehicle body, and the tilt angle control unit comprises a seat surface tilt angle control unit configured to control the tilt angle of the seat surface by driving the seat surface tilt angle changing device.

8. The lane departure prevention assist system according to claim 7, wherein the seat surface tilt angle changing device comprises a seat tilt angle changing device configured to change a tilt angle of the occupant seat with respect to the vehicle body, and the seat surface tilt angle control unit comprises a seat tilt angle control unit configured to tilt the occupant seat by driving the seat tilt angle changing device.

* * * * *